(12) United States Patent
Takanashi

(10) Patent No.: US 10,996,428 B2
(45) Date of Patent: May 4, 2021

(54) IMAGING APPARATUS, ACCESSORY, AND CONTROL METHOD OF THE SAME

(71) Applicant: CANON KABUSHIKI KAISHA, Tokyo (JP)

(72) Inventor: Hideya Takanashi, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 317 days.

(21) Appl. No.: 15/992,859

(22) Filed: May 30, 2018

(65) Prior Publication Data

US 2018/0348474 A1 Dec. 6, 2018

(30) Foreign Application Priority Data

May 31, 2017 (JP) .............................. JP2017-108270
May 7, 2018 (JP) .............................. JP2018-089460

(51) Int. Cl.
| | |
|---|---|
| G02B 7/14 | (2021.01) |
| H04N 5/232 | (2006.01) |
| G02B 7/09 | (2021.01) |
| G02B 7/10 | (2021.01) |
| G02B 27/00 | (2006.01) |
| H04N 5/225 | (2006.01) |

(52) U.S. Cl.
CPC ................. *G02B 7/14* (2013.01); *G02B 7/09* (2013.01); *G02B 7/102* (2013.01); *G02B 27/0037* (2013.01); *H04N 5/2254* (2013.01); *H04N 5/23209* (2013.01)

(58) Field of Classification Search
CPC .................................... G03B 2205/0007–0046
See application file for complete search history.

(56) References Cited

U.S. PATENT DOCUMENTS

| | | | |
|---|---|---|---|
| 7,228,482 B2* | 6/2007 | Nakajima ........... | G06F 11/0757 714/750 |
| 8,395,697 B2* | 3/2013 | Shikaumi ................. | G02B 7/08 348/353 |
| 2009/0208194 A1 | 8/2009 | Honjo et al. | |
| 2011/0229118 A1 | 9/2011 | Imafuji | |
| 2014/0184893 A1 | 7/2014 | Imafuji | |
| 2016/0006923 A1 | 1/2016 | Imamura | |

FOREIGN PATENT DOCUMENTS

| | | |
|---|---|---|
| CN | 105227819 A | 1/2016 |
| JP | 2016035481 A | 3/2016 |
| WO | 2013/171997 A | 11/2013 |

\* cited by examiner

*Primary Examiner* — Clayton E. LaBalle
*Assistant Examiner* — Leon W Rhodes, Jr.
(74) *Attorney, Agent, or Firm* — Canon U.S.A., Inc. I.P. Division

(57) ABSTRACT

An imaging apparatus mutually communicates with an interchangeable lens, via a first communication channel. The imaging apparatus receives optical data transmitted from the interchangeable lens via a second communication channel. The imaging apparatus transmits information relating to a timing for the interchangeable lens to obtain the optical data to the interchangeable lens, and the interchangeable lens obtains the optical data based on this information.

30 Claims, 23 Drawing Sheets

FIG. 4A
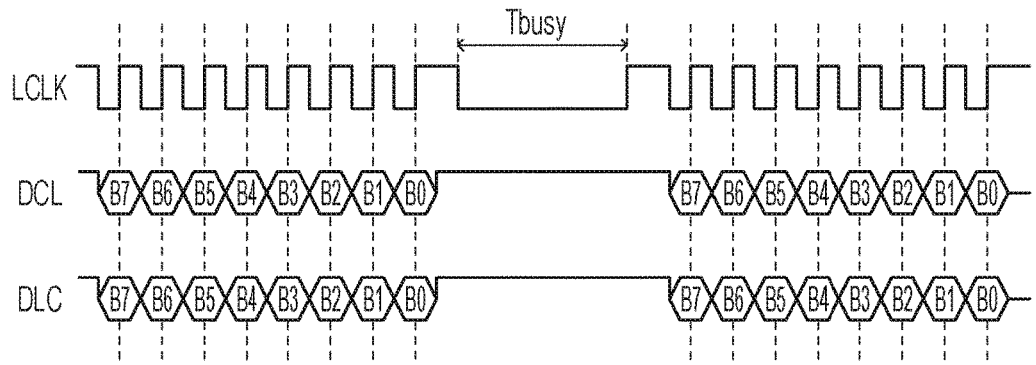
FIG. 4B1
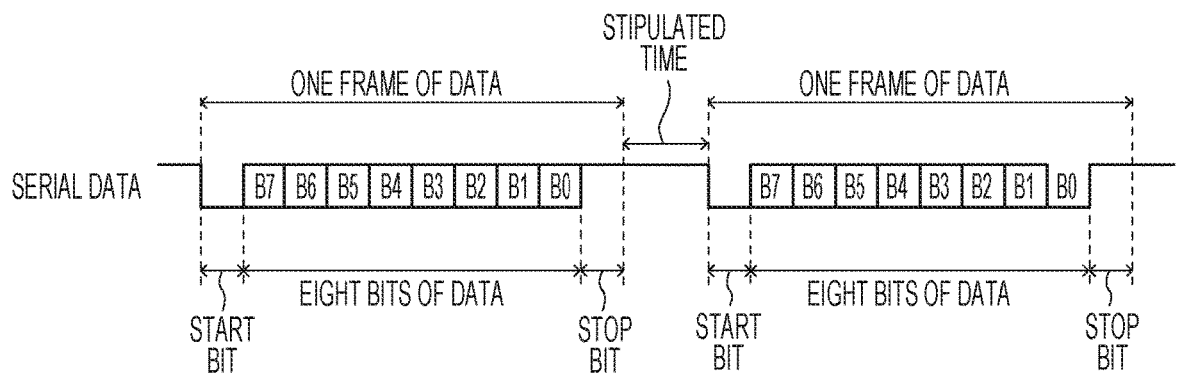
FIG. 4B2
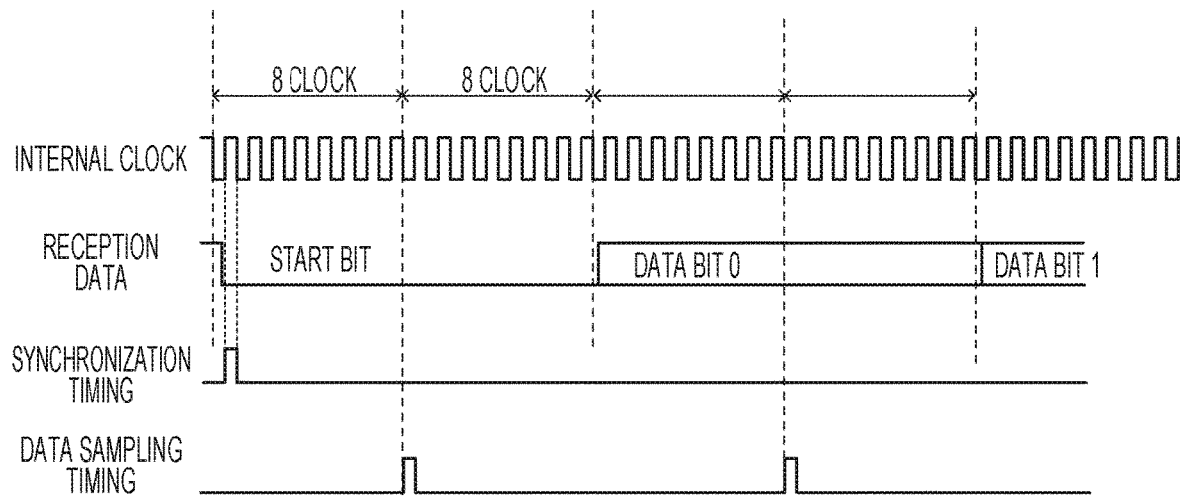

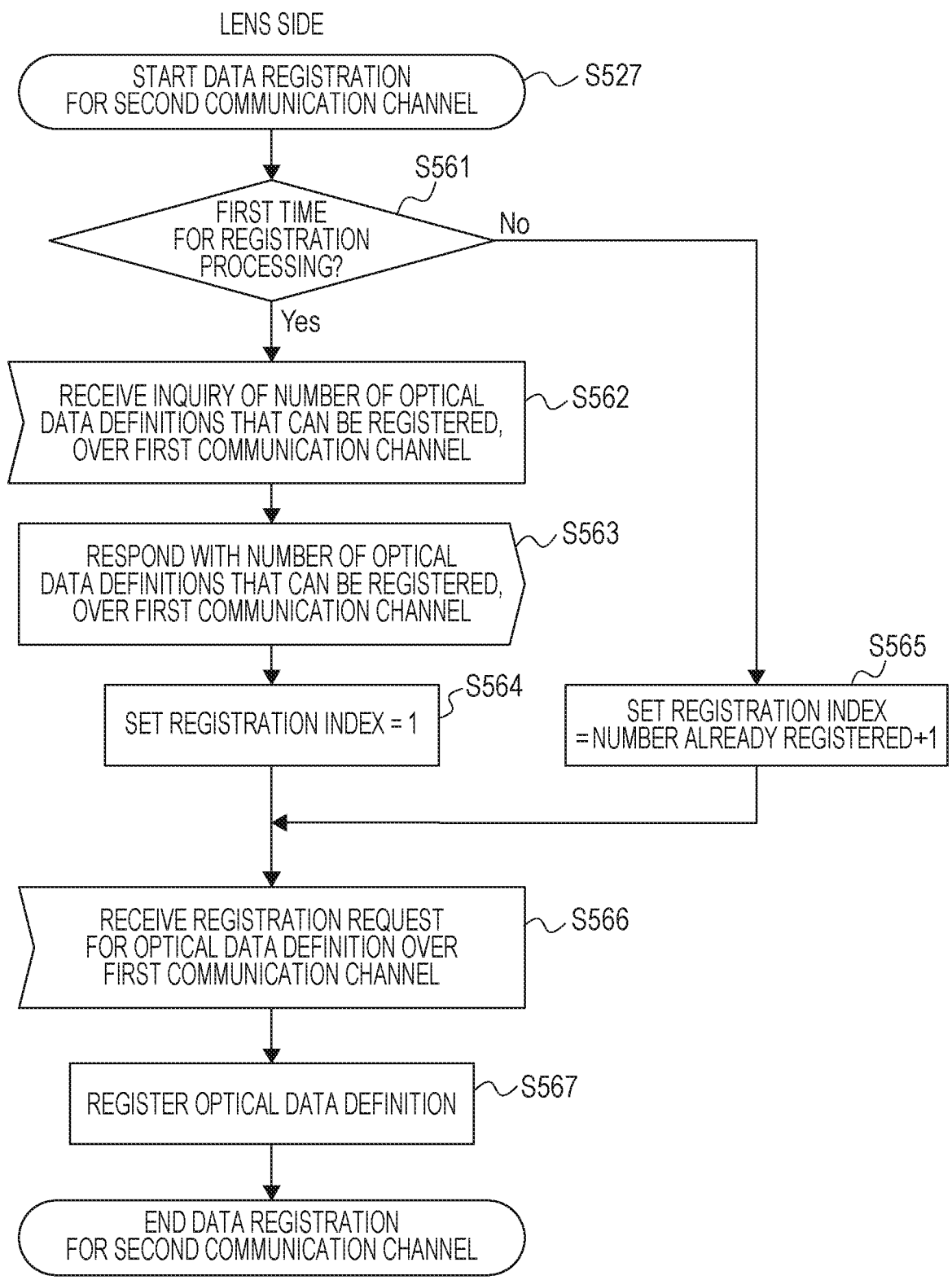

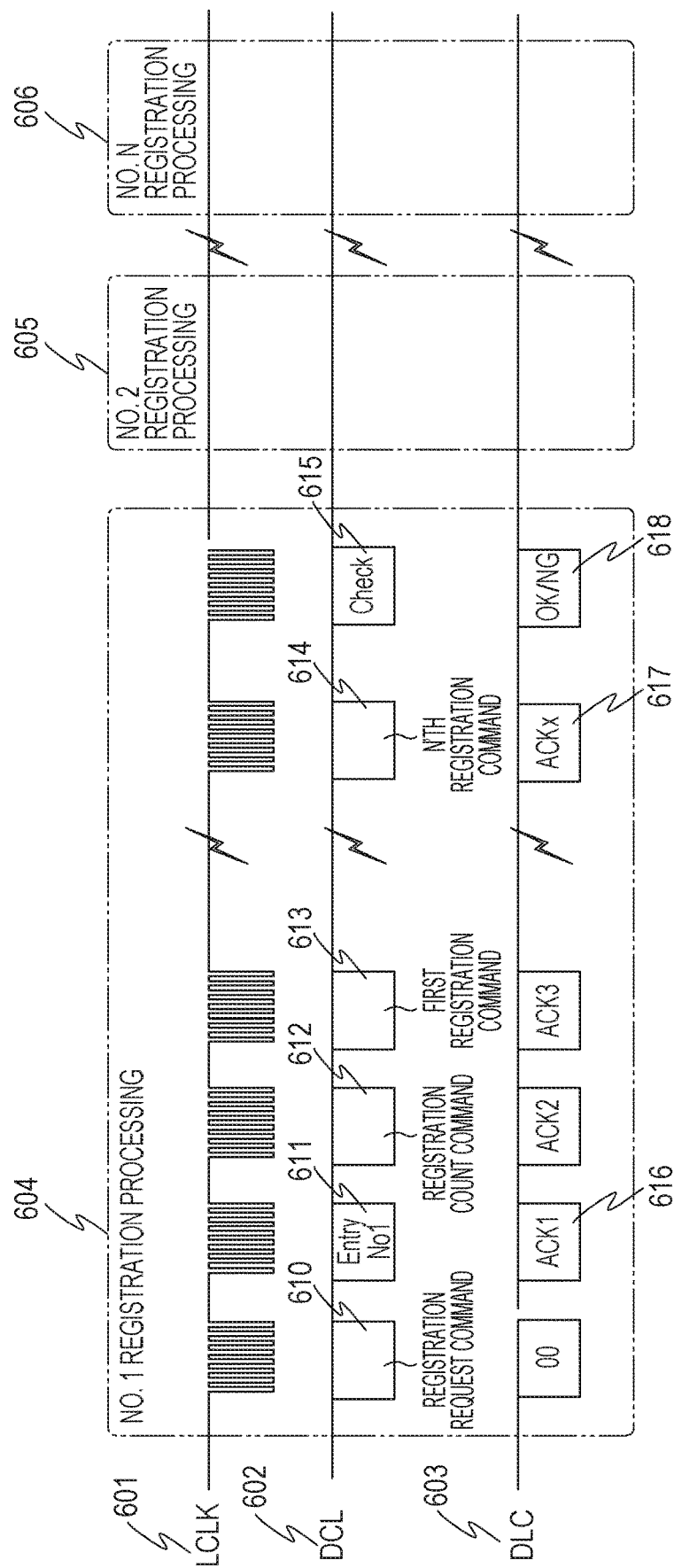

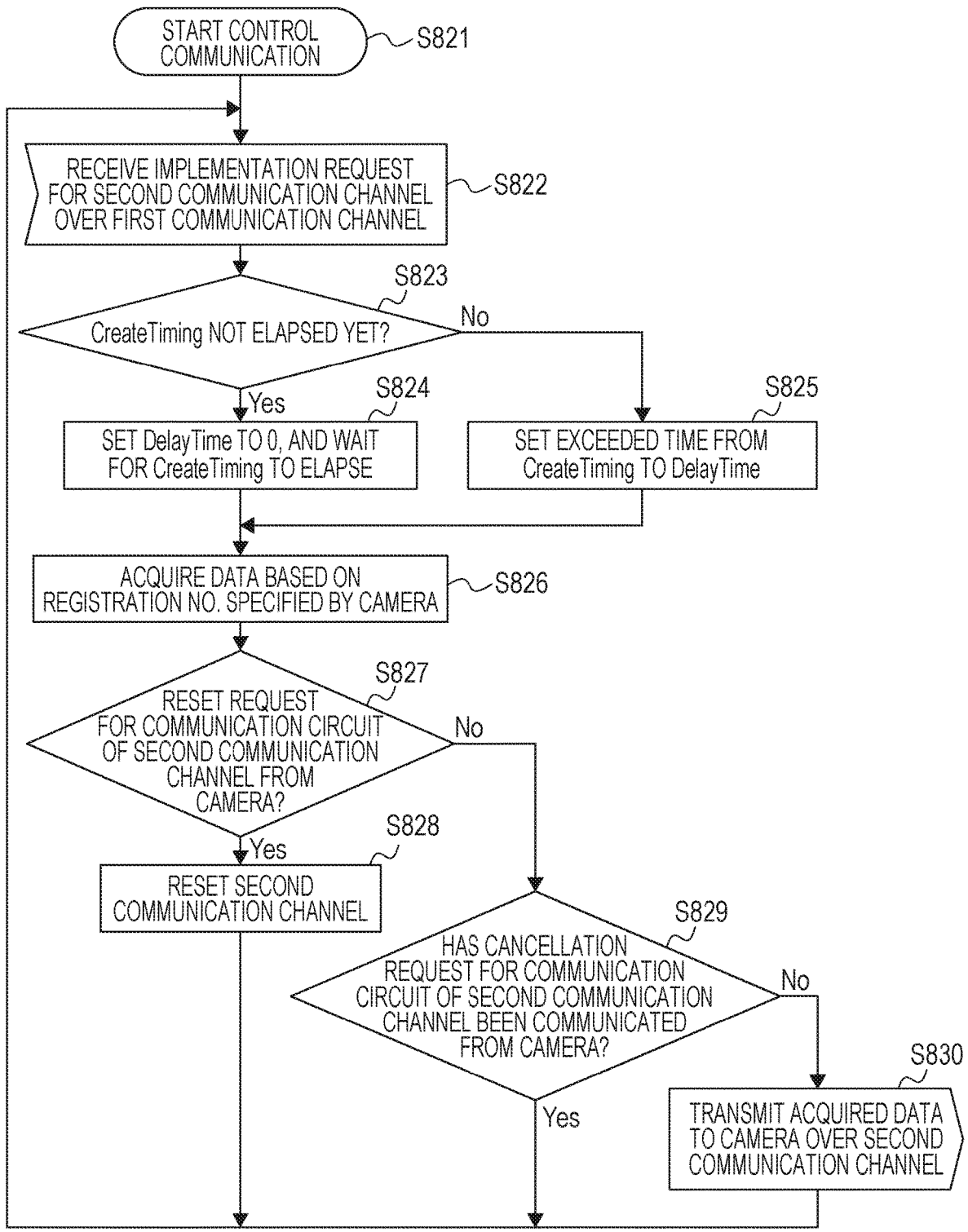

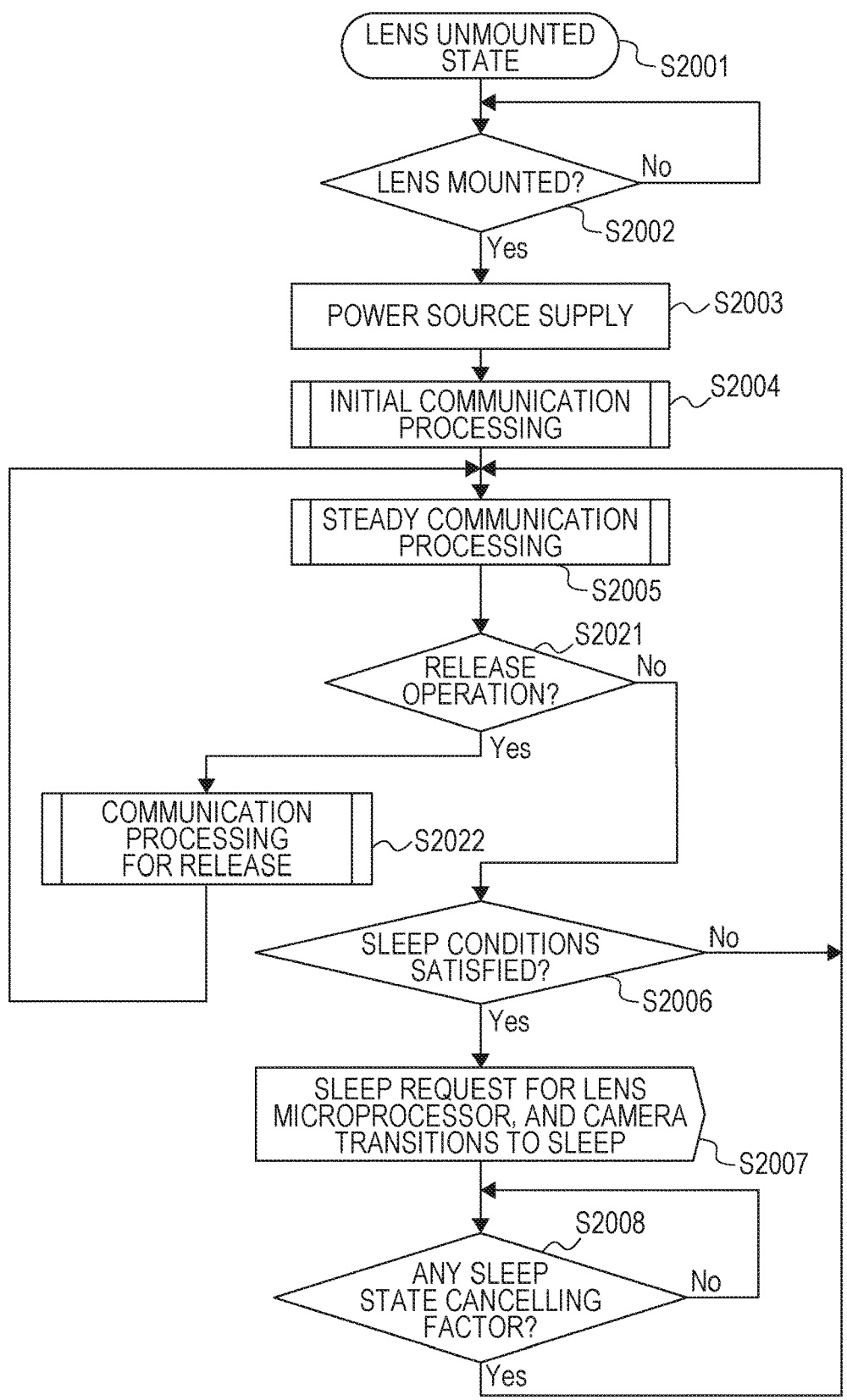

FIG. 12

| | | | | | | | |
|---|---|---|---|---|---|---|---|
| COMMUNICATION COMMAND EXAMPLE (1) | | | | | | | |
| DCL | 0x99 (COMMUNICATION LOGIC RESET REQUEST COMMAND FOR SECOND COMMUNICATION CHANNEL) | | | | | | |
| DLC | DON'T CARE | | | | | | |
| COMMUNICATION COMMAND EXAMPLE (2) | | | | | | | |
| DCL | 0xAA (COMMUNICATION RATE CAPABLE INFORMATION NOTIFICATION COMMAND FOR SECOND COMMUNICATION CHANNEL) | 0x1F (COMMUNICATION RATE INFORMATION) | | | | | |
| DLC | DON'T CARE | | | | | | |
| COMMUNICATION COMMAND EXAMPLE (3) | | | | | | | |
| DCL | 0xBB (COMMUNICATION RATE CAPABLE INFORMATION ACQUISITION COMMAND FOR SECOND COMMUNICATION CHANNEL) | | | | | | |
| DLC | DON'T CARE | 0x07 (COMMUNICATION RATE INFORMATION) | | | | | |
| COMMUNICATION COMMAND EXAMPLE (4) | | | | | | | |
| DCL | 0xCC (EMPLOYED COMMUNICATION RATE NOTIFICATION COMMAND FOR SECOND COMMUNICATION CHANNEL) | 0x04 (COMMUNICATION RATE INFORMATION) | | | | | |
| DLC | DON'T CARE | | | | | | |
| COMMUNICATION COMMAND EXAMPLE (5) | | | | | | | |
| DCL | 0xDD (COMMUNICATION DATA REGISTRATION REQUEST COMMAND FOR SECOND COMMUNICATION CHANNEL) | 0x0A (REGISTRATION COUNT) | 0x11 (FOCAL LENGTH ACQUISITION) | 0x12 (APERTURE DIAMETER INFORMATION ACQUISITION) | ... | 0x1A (FOCUS CORRECTION INFORMATION ACQUISITION) | |
| DLC | | Ack | Ack | Ack | ... | Ack | |
| COMMUNICATION COMMAND EXAMPLE (6) | | | | | | | |
| DCL | 0xE0 (COMMUNICATION IMPLEMENTATION REQUEST COMMAND FOR SECOND COMMUNICATION CHANNEL) | 0x01 (REGISTRATION NO.) | 0x64 (LimitTiming) | 0x08 (CreateTiming) | | | |
| DLC | DON'T CARE | | Ack | Ack | | | |
| COMMUNICATION COMMAND EXAMPLE (7) | | | | | | | |
| DCL | 0xE1 (COMMUNICATION CANCELLATION REQUEST COMMAND FOR SECOND COMMUNICATION CHANNEL) | 0x01 (REGISTRATION NO.) | | | | | |
| DLC | DON'T CARE | Ack | | | | | |

| COMMUNICATION RATE DEFINITION | |
|---|---|
| bit 0 | COMMUNICATION RATE 1 |
| bit 1 | COMMUNICATION RATE 2 |
| bit 2 | COMMUNICATION RATE 3 |
| bit 3 | COMMUNICATION RATE 4 |
| bit 4 | COMMUNICATION RATE 5 |
| bit 5 | COMMUNICATION RATE 6 |
| bit 6 | COMMUNICATION RATE 7 |
| bit 7 | COMMUNICATION RATE 8 |

SLOW

FAST

FIG. 14

| REGISTRATION NO. | REGISTRATION DATA DEFINITIONS |
|---|---|
| 1 | FOCAL LENGTH INFORMATION (2), APERTURE DIAMETER INFORMATION (3), FOCUS POSITION INFORMATION (2), ZOOM POSITION INFORMATION (2), GYRO INFORMATION (20), ..., FOCUS CORRECTION INFORMATION (100) |
| 2 | FOCUS POSITION INFORMATION (2), ..., FOCUS CORRECTION INFORMATION (100) |
| 3 | FOCAL LENGTH INFORMATION (2), APERTURE DIAMETER INFORMATION (3), ZOOM POSITION INFORMATION (2), ..., CURRENT APERTURE POSITION INFORMATION (3) |
| 4 | GYRO INFORMATION (20), ..., TRIPOD FIXATION DETERMINATION INFORMATION (1) |
| ... | ... |
| N | RESERVED |

FIG. 15

COMMUNICATION COMMAND EXAMPLE (8)

| DCL | 0xE2 (COMMUNICATION IMPLEMENTATION REQUEST COMMAND FOR WHEN STATE CHANGE OCCURS ON SECOND COMMUNICATION CHANNEL) | 0x02 (REGISTRATION NO.) | 0x64 (LimitTiming) | 0x01 (Condition) |
|---|---|---|---|---|
| DLC | DON'T CARE | Ack | Ack | Ack |

FIG. 16

| Condition SPECIFICATION BIT STRING | |
|---|---|
| bit 0 | STOP FOCUS DRIVING |
| bit 1 | STOP APERTURE DRIVING |
| bit 2 | STOP IMAGE STABILIZATION DRIVING |
| bit 3 | START FOCUS DRIVING |
| bit 4 | START APERTURE DRIVING |
| bit 5 | START IMAGE STABILIZATION DRIVING |
| bit 6 | ... |
| bit 7 | OR CONDITION SPECIFICATION |

IMAGING APPARATUS, ACCESSORY, AND CONTROL METHOD OF THE SAME

BACKGROUND OF THE INVENTION

Field of the Invention

The present invention relates to communication between an imaging apparatus and an accessory mounted to the imaging apparatus.

Description of the Related Art

In a camera system where an interchangeable lens is attached to an imaging apparatus (hereinafter referred to as camera body), generally, control information is transmitted from the camera body to the interchangeable lens via a communication system, and lens information (data) is transmitted from the interchangeable lens to the camera body. A camera control unit transmits control information such as autofocus (hereinafter, AF) and automatic exposure control (hereinafter, AE), image stabilization (hereinafter, IS) and so forth, based on optical data serving as the control information, to a lens control unit. Upon such control information being propagated from the camera control unit to the lens control unit, the lens control unit operates focus, aperture, and image stabilization mechanism. As a result, optical data such as focus position, focal length, aperture diameter, and so forth, change, and the optical data is propagated to the camera control unit.

Japanese Patent Laid-Open No. 2016-035481 discloses a camera system having two communication channels; a communication channel whereby the camera control unit and lens control unit can exchange data with each other, and a communication channel whereby data can be transmitted from the lens control unit to the camera control unit. When the camera control unit requests the lens control unit for information necessary to restore a shot image on the communication channel, data necessary of restoring the shot image is transmitted from the lens control unit to the camera control unit by lens control, via the latter communication channel. At this time, the lens control unit detects that a LOW level signal has been input from the camera control unit, and generates data to be transmitted to the camera control unit. Upon completion of generating this data, the lens control unit outputs a LOW level signal to the camera control unit, and transmits generated data to the camera control unit. According to the technology disclosed in Japanese Patent Laid-Open No. 2016-035481, communication over the former communication channel and communication over the latter communication channel can be performed in parallel, while transmitting information necessary for restoring a shot image from the lens control unit to the camera control unit over the latter communication channel.

SUMMARY OF THE INVENTION

According to the disclosure in Japanese Patent Laid-Open No. 2016-035481, the camera control unit obtains information regarding which generation has been started at a timing of the lens control unit receiving the request, so the lens control unit cannot specify any timing other than this timing for the timing for the lens control unit to obtain data. That is to say, the camera control unit cannot receive optical data from the lens control unit at a timing where the camera control unit cannot communicate a request for information to the lens control unit, for example.

On the other hand, there is demand for a technology where the camera control unit can obtain appropriate optical data at a timing preferable for control of the camera body, such as accumulation of center-of-gravity time of images of the camera body for example, in order to improve precision of the above-described AF, AE, IS, and so forth, in particular. The reason is that the precision of control can be improved by matching the camera body control timing and timing for acquiring optical data regarding control of the camera body using optical data of the lens.

It has been found desirable to provide an imaging apparatus, accessory, and control method of these, whereby optical data can be obtained at a more appropriate timing as compared to the related art.

According to an aspect of the present invention, an imaging apparatus capable of being mounted with an accessory includes a first communication control unit configured to control first communication via a first communication channel by which communication can be mutually performed with the accessory, and a second communication control unit configured to control second communication via a second communication channel by which data transmitted from the accessory can be received. The first communication control unit transmits, along with first instruction information requesting the accessory for optical data, first information relating to a timing at which the accessory obtains the optical data that is being requested of the accessory.

According to another aspect of the present invention, an accessory capable of being mounted to an imaging apparatus includes a first communication control unit configured to control first communication via a first communication channel by which communication can be mutually performed with the imaging apparatus, a second communication control unit configured to control second communication via a second communication channel by which data can be transmitted to the imaging apparatus, and an obtaining unit configured to obtain optical data, based on first information relating to a timing of obtaining optical data, which the first communication control unit has received along with first instruction information requesting the optical data.

Further features of the present invention will become apparent from the following description of exemplary embodiments with reference to the attached drawings.

BRIEF DESCRIPTION OF THE DRAWINGS

FIGS. 4A through 4B2 are diagrams for describing a communication format between the camera body and interchangeable lens according to the first embodiment.

FIG. 5D is a flowchart illustrating registration data processing that the lens microprocessor performs in the first embodiment.

FIG. 6 is a diagram explaining optical data definitions in the first embodiment.

FIG. 8B is a flowchart illustrating communication processing that the lens microprocessor performs over the second communication channel in the first embodiment.

FIG. 11A is a main flowchart illustrating overall processing of the camera microprocessor according to the first embodiment.

FIG. 12 is a diagram illustrating examples of communication commands according to the first embodiment.

FIG. 14 is a diagram illustrating optical data definitions according to the first embodiment.

FIG. 15 is a diagram illustrating examples of communication commands according to the second embodiment.

FIG. 16 is a diagram illustrating examples of Condition commands according to the second embodiment.

DESCRIPTION OF THE EMBODIMENTS

Embodiments of the present invention will be described with reference to the drawings. Each of the embodiments of the present invention described below can be implemented solely or as a combination of a plurality of the embodiments or features thereof where necessary or where the combination of elements or features from individual embodiments in a single embodiment is beneficial.

First Embodiment

1. Configuration of Camera System (FIG. 1)

Figure 1:
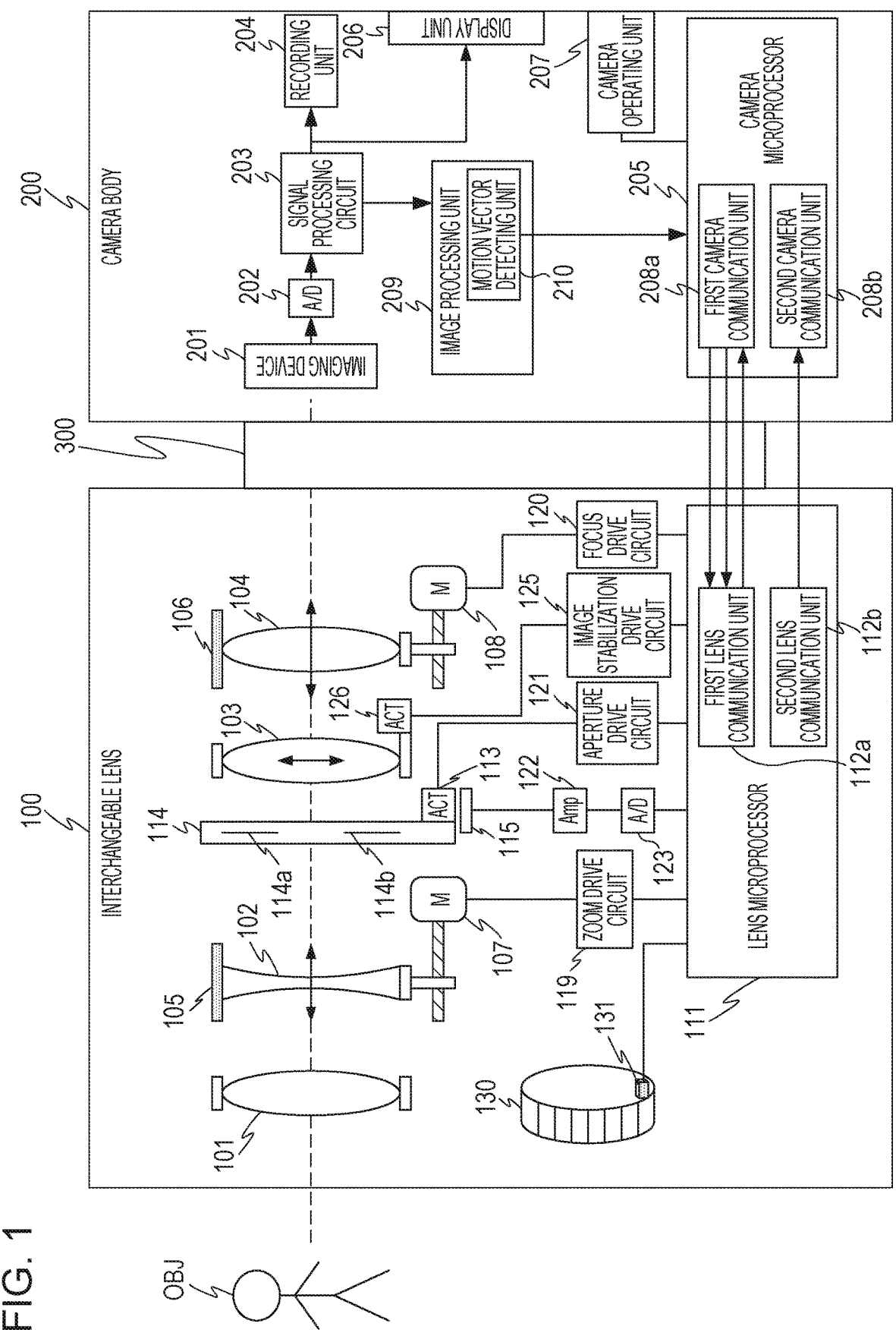
FIG. 1 is a diagram illustrating the configuration of a camera body and interchangeable lens making up a camera system according to a first embodiment of the present invention.

FIG. 1 exemplarily illustrates the configuration of an imaging system (hereinafter referred to as "camera system") including a camera body 200 serving as an imaging apparatus, and an interchangeable lens 100 serving as an accessory detachably mounted thereto, as a first embodiment of the present invention. Although the interchangeable lens 100 is exemplarily illustrated as the accessory in the present embodiment, the present invention can be applied to devices other than interchangeable lenses, as long as the device is directly or indirectly connectable to the camera body 200, and can communicate with the camera body 200.

The camera body 200 has an imaging device 201, such as a charge-coupled device (CCD) sensor, complementary metal-oxide semiconductor (CMOS) sensor, or the like, and the interchangeable lens 100 has an imaging optical system that forms an image of an object on the imaging device 201. The camera body 200 and interchangeable lens 100 use three-line clock synchronous communication or asynchronous communication to transmit commands (also referred to as instruction information) from the camera body 200 to the interchangeable lens 100. The interchangeable lens 100 also transmits responses to the commands to the camera body 200. In the present embodiment, the camera body 200 transmits control commands to the interchangeable lens 100, for example. A control command is a signal controlling (instructing) operations of the interchangeable lens 100 zooming operations, light amount adjustment operations, focusing operations, and image stabilization operations of the interchangeable lens 100. The interchangeable lens 100 also transmits responses to the camera body 200 as to control commands received from the camera body 200. Further, the interchangeable lens 100 transmits optical data of the interchangeable lens 100 to the camera body 200. Optical data includes optical state data indicating the optical state, such as focal length of the photographing optical system, aperture diameter, position of focus lens, and so forth, within the interchangeable lens 100, and optical correction data such as focus correction data necessary for autofocus (AF). This optical data is transmitted to the camera body 200, in accordance with data specification commands that are transmitted from the camera body 200 to the interchangeable lens 100.

A specific configuration of the interchangeable lens 100 and camera body 200 will be described. The interchangeable lens 100 and camera body 200 are mechanically and electrically connected via a mount 300 that is a joining mechanism. The interchangeable lens 100 is supplied with electric power source from the camera body 200 via an electric power source terminal portion (omitted from illustration) provided at the mount 300, and operates various types of actuators and a lens microprocessor 111. The interchangeable lens 100 and camera body 200 also perform communication with each other via a communication terminal portion (illustrated in FIG. 2) that is provided at the mount 300.

The imaging optical system of the interchangeable lens 100 includes, in order from the side of an object OBJ, a field lens 101, a zoom lens 102 for zooming, an aperture unit 114 that adjusts the amount of light passing through, an image stabilizing lens 103, and a focus lens 104 for focusing. The zoom lens 102 and focus lens 104 are held by lens holding frames 105 and 106, respectively. The lens holding frames 105 and 106 are movably guided in the optical axis direction indicated in FIG. 1 by a dashed line, by a guide shaft omitted from illustration. The lens holding frames 105 and 106 respectively are driven in the optical axis direction by a zoom actuator 107 and focus actuator 108, which are configured of stepping motors. The zoom actuator 107 and focus actuator 108 respectively move the zoom lens 102 and focus lens 104, synchronously with driving pulses.

The image stabilizing lens 103 reduces image blurring due to shaking of hands holding the camera or the like, or shaking of the camera, by moving (shifting) in a direction orthogonal to the optical axis of the imaging optical system. The camera system according to the present embodiment can also perform image stabilization control by the camera body 200 and interchangeable lens 100 communicating in order for the camera body 200 and interchangeable lens 100 to coordinate with each other and further raise image stabilization effects. These coordinated operations need communication processing with high real-time performance between the camera body 200 and interchangeable lens 100. Specifically, the interchangeable lens 100 transmits, to the camera body 200, information of camera shaking detected by a shake sensor such as a vibrating gyroscope or the like (omitted from illustration), provided within the interchangeable lens 100, within a charge accumulation period of the imaging device 201 when imaging at the camera body 200. The interchangeable lens 100 also receives information of motion vectors from the camera body 200, so as to be in time for image stabilizing driving where the image stabilizing lens 103 is shifted. In order to realize such high real-time performance in the present embodiment, a later-described first communication channel and second communication channel are separately provided. Note that "communication channel" as used in the present embodiment means an increment of communication path for realizing desired communication functions, and each communication channel is configured of one or more communication lines.

Figure 2:
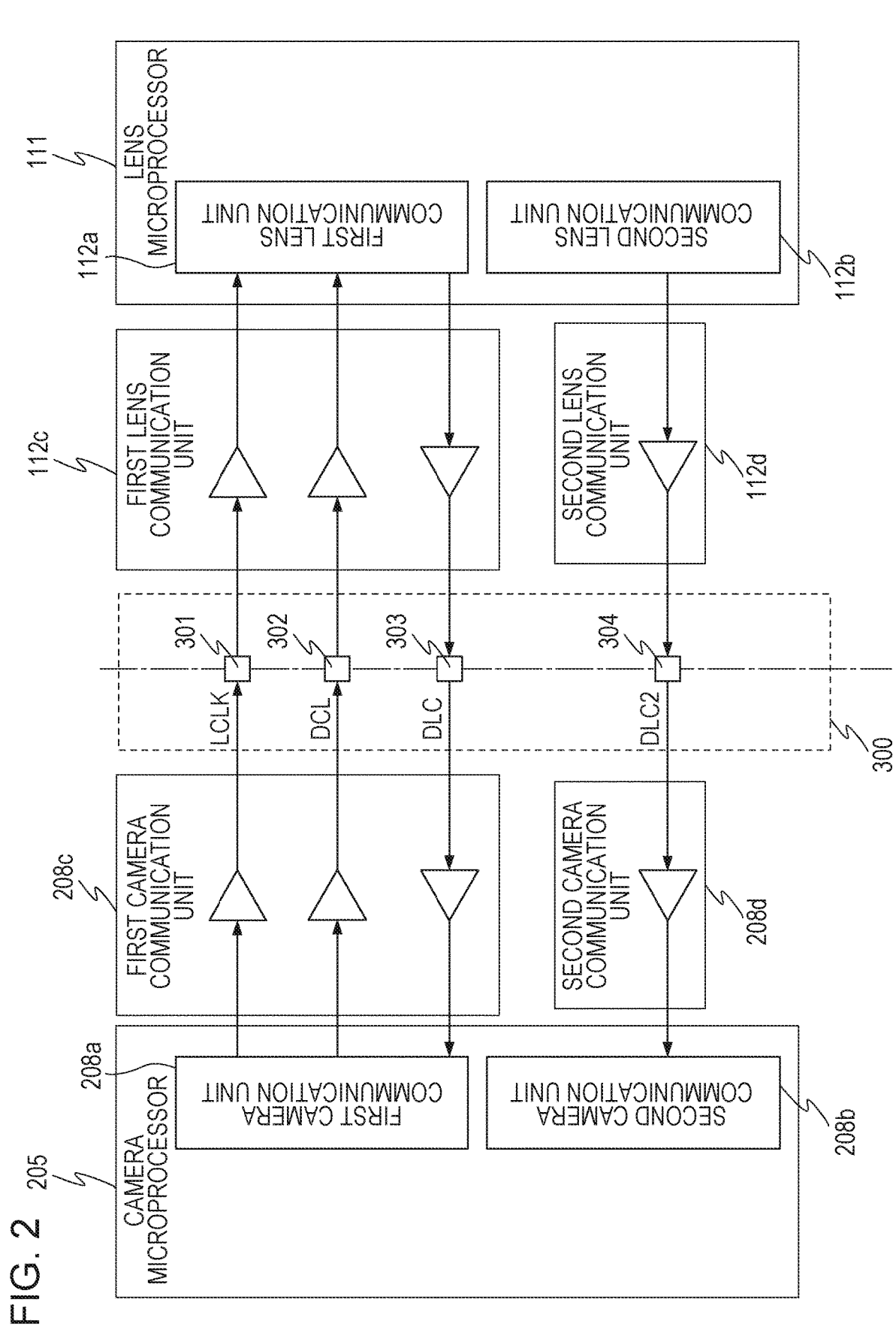
FIG. 2 is a diagram illustrating a mount configuration between the camera body and interchangeable lens according to the first embodiment.

The lens microprocessor 111 controls operations of various parts within the interchangeable lens 100. The lens microprocessor 111 communicates with a camera microprocessor 205 in the camera body 200, via a first lens communication unit 112a, and a second lens communication unit 112b. In FIGS. 1 and 2, the first lens communication unit 112a is written as "first lens communication unit", and the second lens communication unit 112b is written as "second lens communication unit". The first lens communication unit 112a forms a first communication channel (hereinafter "first communication channel") with the camera microprocessor 205. The second lens communication unit 112b forms a second communication channel (hereinafter "second communication channel") with the camera microprocessor 205.

The lens microprocessor 111 receives control commands, and data specification commands (later-described registration No. commands) specifying optical data which the lens microprocessor 111 is requested to transmit, which are transmitted from the camera microprocessor 205 via the first communication channel, at the first lens communication unit 112a. The lens microprocessor 111 also transmits data requested by the camera microprocessor 205 as a response to the above control commands from the first lens communication unit 112a to the camera microprocessor 205 via the first communication channel. On the other hand, the lens microprocessor 111 transmits the above optical data from the second lens communication unit 112b to the camera microprocessor 205 via the second communication channel, based on a timing instructed by the camera. The lens microprocessor 111 controls communication with the camera microprocessor 205 in accordance with a communication control program that is a computer program.

Specifically, the lens microprocessor 111 causes a zoom drive circuit 119 and a focus drive circuit 120 to respectively drive the zoom actuator 107 and focus actuator 108, in accordance with control commands from the camera microprocessor 205 regarding zooming and focusing operations. Accordingly, zooming processing where zooming operations by the zoom lens 102 are controlled, and autofocus (AF) processing where focusing operations by the focus lens 104 are controlled, are carried out.

The interchangeable lens 100 has a manual focus ring 130 that can be rotationally operated by the user, and a focus encoder 131 that detects the rotation operation amount of this manual focus ring 130. The lens microprocessor 111 causes the focus drive circuit 120 to drive the focus actuator 108 and move the focus lens 104 in accordance with the rotation operation amount of the manual focus ring 130 detected by the focus encoder 131. Thus, manual focus (MF) is carried out.

The aperture unit 114 has aperture blades 114a and 114b, and an aperture actuator 113 that moves these so as to open and close. The state (position) of the aperture blades 114a and 114b is detected by a Hall effect device 115, and output signals from the Hall effect device 115 are input to the lens microprocessor 111 via an amplifying circuit 122 and an A/D conversion circuit 123. The lens microprocessor 111 causes an aperture drive circuit 121 to drive the aperture actuator 113 based on input signals from the A/D conversion circuit 123. The lens microprocessor 111 causes the aperture drive circuit 121 to drive the aperture actuator 113 in accordance with control commands regarding light amount adjustment operations from the camera microprocessor 205. Accordingly, light amount adjustment processing where light amount adjustment operations of the aperture unit 114 are control is performed.

Further, the lens microprocessor 111 drives an image stabilization armature 126 via an image stabilization drive circuit 125 in accordance with shaking detected by an unshown shaking sensor such as a vibrating gyroscope or the like, provided in the interchangeable lens 100. The lens microprocessor 111 causes the image stabilization drive circuit 125 to drive the image stabilization armature 126 in response to control commands regarding image stabilization operations from the camera microprocessor 205. Accordingly, image stabilization processing is performed where image stabilization operations of the image stabilizing lens 103 being moved to reduce (correct) blurring are controlled.

The camera body 200 has the above-described imaging device 201, an A/D conversion circuit 202, a signal processing circuit 203, a recording unit 204, the camera microprocessor 205, and a display unit 206. The imaging device 201 performs photoelectric conversion of a subject image formed by the imaging optical system within the interchangeable lens 100, and outputs electric signals (analog signals). The A/D conversion circuit 202 converts the analog signals from the imaging device 201 into digital signals.

The signal processing circuit 203 performs various types of image processing on the digital signals from the A/D conversion circuit 202 and generates image signals. The signal processing circuit 203 also generates focus information indicating the contrast state of the subject image, i.e., the focus state of the imaging optical system, and luminance information representing the exposure state, from the image signals. The signal processing circuit 203 outputs the image signals to the display unit 206, and the display unit 206 displays the image signals as a live view image used to confirm composition, focus state, and so forth. The signal processing circuit 203 also outputs the image signals to the recording unit 204, and the recording unit 204 records the image signals.

An image processing unit 209 performs correction processing on the image signals generated by the signal processing circuit 203, for correction of various types of aberration. The image processing unit 209 includes a motion vector detecting unit 210. The motion vector detecting unit 210 detects motion vectors among multiple frame images making up the image signals generated by the signal processing circuit 203. The information of motion vectors detected in this way is transmitted to the lens microprocessor 111 via the first communication channel, as a part of control commands regarding image stabilization operations, and is reflected in image stabilization processing.

The camera microprocessor 205 controls the camera body 200 in accordance with input from a camera operating unit 207 that includes an imaging instruction switch that is omitted from illustration, and various types of settings switches and so forth. The camera microprocessor 205 communicates with the lens microprocessor 111 via a first camera communication unit 208a and a second camera communication unit 208b. In FIGS. 1 and 2, the first camera communication unit 208a is written as "first camera communication unit", and the second camera communication unit 208b is written as "second camera communication unit". The first camera communication unit 208a forms the above-described first communication channel with the lens microprocessor 111, and the second camera communication unit 208b forms the above-described second communication channel with the lens microprocessor 111.

The camera microprocessor 205 transmits control commands regarding zoom operations in accordance with operations of a zoom switch that is omitted from illustration, to the lens microprocessor 111 from the first camera communication unit 208a via the first communication channel. In the same way, the camera microprocessor 205 transmits control commands regarding focus operations in accordance with light amount adjustment operations of the aperture unit 114 according to luminance information and focus operations of the focus lens 104 according to focus information, to the lens microprocessor 111 via the first communication channel. The camera microprocessor 205 controls communication with the lens microprocessor 111 following a communication control program that is a computer program.

2. Configuration of First Communication Channel and Second Communication Channel Next, the configuration of the first and second communication channels provided between the camera microprocessor 205 and lens microprocessor 111 will be described in detail, with reference to FIG. 2. The aforementioned mount 300 is provided with communication terminal portions 301 through 304. The first camera communication unit 208a is connected to three communication terminal portions 301 through 303 via a first camera communication interface circuit (unit) 208c. The first lens communication unit 112a is connected to the communication terminal portions 301 through 303 via a first lens communication interface circuit (unit) 112c. Accordingly, this forms the first communication channel made up of three lines (three communication lines). The first communication channel performs communication by a communication method realized by three lines, such as three-line clock synchronous communication and line asynchronous communication (using at least two lines). In the following, the first communication channel performs three-line clock synchronous communication.

The second camera communication unit 208b is connected to one communication terminal portion 304 via a second camera communication interface circuit (unit) 208d. The second lens communication unit 112b is connected to the communication terminal portion 304 via the second lens interface circuit (unit) 112d. Accordingly, this forms the second communication channel made up of one line (one communication line). The second communication channel performs communication by a communication method realized by on line. In the following, the second communication channel performs asynchronous communication.

2-1. Configuration of First Communication Channel

The first communication channel is made up of a clock communication line (LCLK) serving as a first communication line, a camera-lens communication line (DCL) serving as a second communication line, and a first lens-camera communication line (DLC) serving as a third communication line. The clock communication line is a communication line that supplies clock signals, serving as timing signals for obtaining data from the camera microprocessor 205 that is the communication master for the lens microprocessor 111. Communication by the camera-lens communication line (DCL) and communication by the first lens-camera communication line (DLC) are each performed at timings corresponding to these clock signals. Thus, the clock signals are signals that control timing for communication by the camera-lens communication line (DCL) and communication by the first lens-camera communication line (DLC).

The camera-lens communication line is a communication line for transmitting various types of commands, such as the above-described control commands and data specification commands (including requests) from the camera microprocessor 205 to the lens microprocessor 111. The first lens-camera communication line is a communication line for transmitting various types of notifications, such as responses as to the various types of commands that the lens microprocessor 111 has received from the camera microprocessor 205, and so forth, to the camera microprocessor 205.

The various types of commands transmitted from the camera microprocessor 205 to the lens microprocessor 111 also include rate specification commands. In order for asynchronous communication to be established on the second communication channel, the communication speed (communication bitrate) for performing communication between the camera microprocessor 205 and lens microprocessor 111 needs to be agreed beforehand, and communication needs to be performed following this agreement. In the present embodiment, the communication bitrate is shared between the camera microprocessor 205 and lens microprocessor 111 as an agreement, by the camera microprocessor 205 transmitting (instructing) a rate specification command serving as a command specifying this communication bitrate to the lens microprocessor 111. The communication bitrate indicates the amount of data that can be transferred per second, and the unit thereof is bps (bits per second). Further, in the present embodiment, the data structure and communication timing for communication implemented on the second communication channel are instructed over the first communication channel. Details will be described later.

Various types of notifications transmitted from the lens microprocessor 111 to the camera microprocessor 205 include responses indicating reception of control commands and the driving state of actuators driven in accordance with the control commands, and notification communication bitrates that can be realized on the second communication channel. In a case where a communication abnormality has occurred on the second communication channel, an abnormality notification to the camera microprocessor 205 is also included.

2-2. Configuration of Second Communication Channel

The second communication channel is configured of a single second lens-camera communication line (DLC2) serving as a first accessory-camera communication line. This second lens-camera communication line is a channel for transmitting the above-described optical data of the interchangeable lens 100 from the lens microprocessor 111 to the camera microprocessor 205. This also is a communication line for transmitting data relating to state change at the side of the interchangeable lens 100 from the lens microprocessor 111 to the camera microprocessor 205.

Although the second communication channel is configured of only one DLC2 in the present embodiment, the communication cannel may be configured of multiple DLC2s. The second communication channel is configured of only one DLC2 in the present embodiment, in order to reduce the number of communication terminal portions provided to the mount 300 as compared to a case of configuring using multiple DLC2s, thereby preventing the mount 300 from becoming large.

The lens microprocessor 111 serves as a communication master to control timing of the communication performed at the second communication channel, and communication can be performed at a timing not dependent on the timing of communication by the first communication channel. More specifically, communication by the second lens-camera communication line can be performed at a timing regardless of timings corresponding to clock signals transmitted from the camera microprocessor 205 to the lens microprocessor 111 via the clock communication line.

Note that in the present embodiment, in a case where the lens microprocessor 111 and camera microprocessor 205 perform communication via the first communication channel and communication via the second communication channel, in parallel, information that the lens microprocessor 111 transmits via the second communication channel is different information from information transmitted via the first communication channel. In other words, the lens microprocessor 111 transmits data, other than data transmitted via the first communication channel, via the second communication channel.

The camera body 200 according to the present embodiment can also mount interchangeable lenses that have communication functions via the first communication channel but do not have communication functions via the second communication channel. In this case, the camera microprocessor 205 and interchangeable lens perform transmission/reception of various types of commands from the camera microprocessor 205 to the interchangeable lens, and transmission/reception of the above-described responses from the interchangeable lens to the camera microprocessor 205 and optical data, via only the first communication channel.

3. Communication Block Diagram (FIG. 3)

Figure 3:
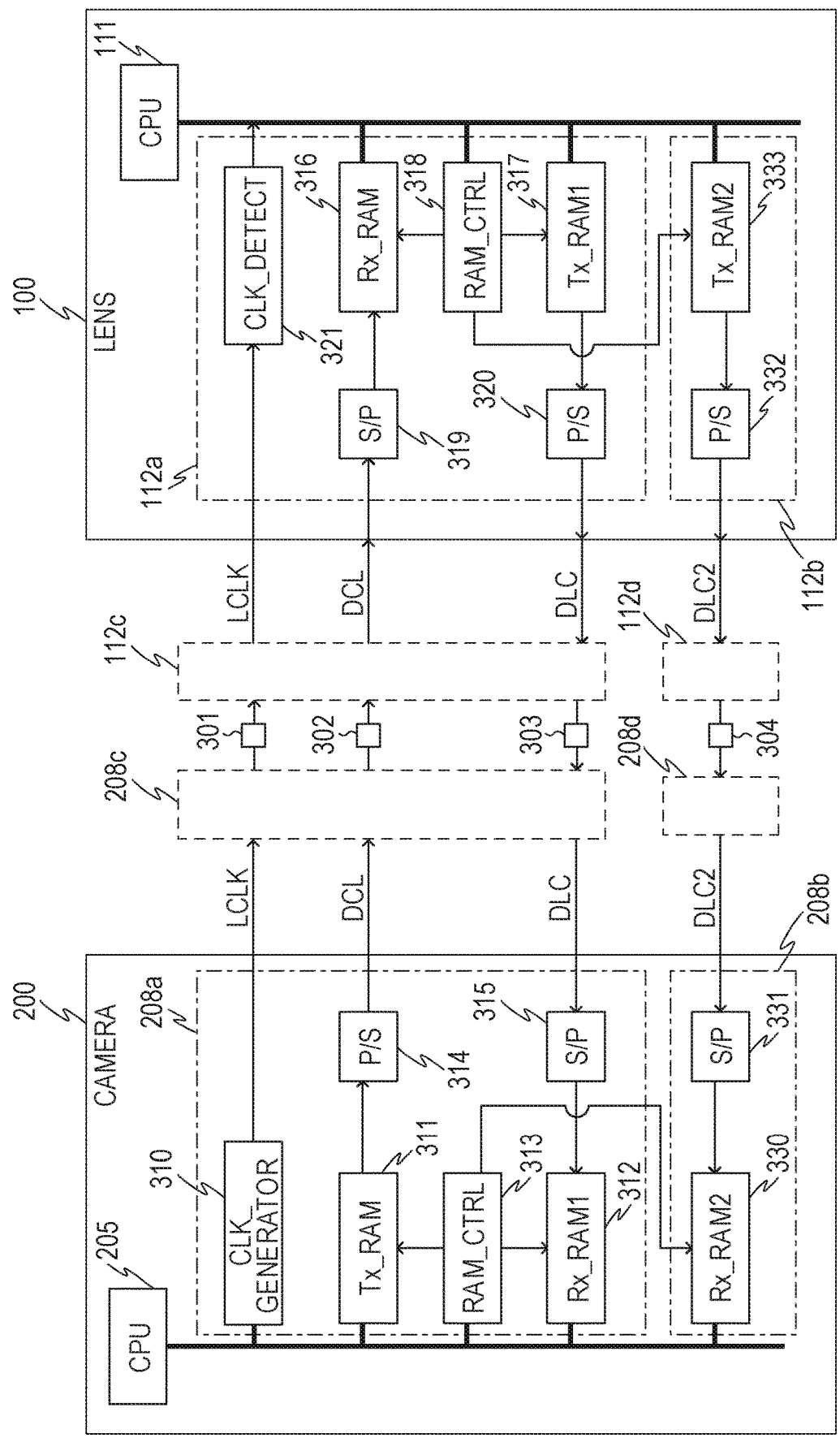
FIG. 3 is a diagram illustrating communication blocks of the camera body and interchangeable lens according to the first embodiment.

FIG. 3 illustrates a further detailed configuration of the first and second camera communication units 208a and 208b and the first and second lens communication units 112a and 112b.

3-1. Configuration of First and Second Camera Communication Units 208a and 208b

In the first camera communication unit 208a, a clock generator (CLK_GENERATOR) 310 generates the above-described clock signals, and outputs to the clock channel (LCLK) of the first communication channel. A transmission data buffer (Tx_RAM) 311 is memory storing various types of commands, such as control commands to be transmitted to the lens microprocessor 111 via the camera-lens communication channel (DCL) of the first communication channel, and is made up of random access memory (RAM) or the like. A transmission parallel/serial converter 314 convers various types of commands, stored in the transmission data buffer 311 as parallel data, into serial data and outputs to the camera-lens communication line (DCL).

A reception serial/parallel converter 315 converts notifications transmitted as serial data from the lens microprocessor 111 via the first lens-camera communication line (DLC) of the first communication channel into parallel data. A reception data buffer (Rx_RAM1) 312 is memory storing notifications as parallel data from the reception serial/parallel converter 315, and is made up of RAM or the like.

A camera buffer control unit (RAM_CTRL) 313 controls the transmission data buffer 311 and the reception data buffer 312 of the first camera communication unit 208a, and also controls a data reception buffer (Rx_RAM2) 330 of the second camera communication unit 208b. In the second camera communication unit 208b, a reception serial/parallel converter 331 converts optical data that is serial data transmitted from the lens microprocessor 111 via the second lens-camera communication line (DLC2) of the second communication channel, into parallel data. The data reception buffer (Rx_RAM2) 330 is memory that stores optical data that is parallel data from the reception serial/parallel converter 331, and is made up of RAM or the like.

3-2. Configuration of First and Second Lens Communication Unit 112a and 112b

In the first lens communication unit 112a, a clock detection unit (CLK_DETECT) 321 detects clock signals input via the clock channel of the first communication channel. A reception serial/parallel converter 319 converts various types of commands that are serial data, transmitted from the camera microprocessor 205 via the camera-lens communication line (DCL) of the first communication channel, into parallel data. A reception data buffer (Rx_RAM) 316 is memory that stores various types of commands that are parallel data from the reception serial/parallel converter 319, and is made up of RAM or the like.

A transmission data buffer (Tx_RAM1) 317 is memory that stores notifications to be transmitted to the camera microprocessor 205 via the first camera-lens communication line (DCL) of the first communication channel, and is made up of RAM or the like. A transmission parallel/serial converter 320 converts notifications, stored in the transmission data buffer 317 as parallel data, into serial data, and outputs to the first lens-camera communication line (DLC).

A lens buffer control unit (RAM_CTRL) 318 controls the reception data buffer 316 and transmission data buffer 317 of the first lens communication unit 112a, and also control a data transmission buffer (Tx_RAM2) 333 of the second lens communication unit 112b.

In the second lens communication unit 112b, a transmission data buffer (Tx_RAM2) 333 is memory that stores optical data to be transmitted to the camera microprocessor 205 via the second lens-camera communication line (DLC2) of the second communication channel, and has RAM or the like. A transmission parallel/serial converter 332 converts optical data, stored in the data transmission buffer 333 as parallel data, into serial data, and outputs to the second lens-camera communication line (DLC2).

3-3. Communication by First Communication Channel

Data that is various types of commands transmitted from the camera microprocessor 205 to the lens microprocessor 111 over the first communication channel are first set in the transmission data buffer 311 from the camera microprocessor 205. For example, data of a control command instructing a focusing operation is made up of multiple bytes indicating focusing drive amount, focusing drive speed, and so forth, and first is written to the transmission data buffer 311 of the first camera communication unit 208a. The buffer control unit 313 causes the transmission data buffer 311 to output data to be transmitted, one byte at a time. The transmission parallel/serial converter 314 converts the output data from parallel data into serial data. The data that has been converted into serial data is then transmitted to the lens microprocessor 111 over the camera-lens communication line (DCL).

The data transmitted to the lens microprocessor 111 over the camera-lens communication line (DCL) is converted from serial data into parallel data at the reception serial/parallel converter 319 of the first lens communication unit 112a. The buffer control unit 318 stores this parallel data in the reception data buffer 316. The clock detection unit (CLK_DETECT) 321 detects clock signals output from the clock control unit 310 at the camera microprocessor 205 side when receiving the serial data, and detects reception data synchronously with this clock signal.

In a case of transmitting data as notifications from the lens microprocessor 111 to the camera microprocessor 205 via the first communication channel, first, this data is set in the transmission buffer 317 at the first lens communication unit 112a. For example, data made up of multiple bytes is written to the transmission data buffer 317, as a response indicating the drive state of the focus actuator. The buffer control unit 318 then causes the transmission data buffer 317 to output the data to be transmitted, one byte at a time, in accordance with the clock detecting unit 321 detecting clock signals. The transmission parallel/serial converter 320 converts the output data from parallel data into serial data. The data that has been converted into serial data is then transmitted to the camera microprocessor 205 over the first lens-camera communication line (DLC).

The data that has been transmitted to the camera microprocessor 205 over the first lens-camera transmission channel (DLC) is converted from serial data into parallel data at the reception serial/parallel converter 315 of the first camera communication unit 208a. The buffer control unit 313 stores this parallel data in the reception data buffer 312.

Thus, transmission of various types of commands, such as control commands from the camera microprocessor 205 to the lens microprocessor 111 via the first communication channel, and notification such as response to the control commands and so forth, from the lens microprocessor 111 to the camera microprocessor 205, are performed.

3-4. Communication by Second Communication Channel

On the other hand, only the second lens-camera communication channel (DLC2) for one-way data communication from the lens microprocessor 111 to the camera microprocessor 205 is provided for the second communication channel. Accordingly, asynchronous communication, where the lens microprocessor 111 and camera microprocessor 205 each synchronize data by the respective internal clocks, is performed on the second communication channel. The communication format for asynchronous communication will be described later.

The lens microprocessor 111 receives commands requesting transmission of optical data, commands indicating registration Nos. to identify optical data, commands instructing timing for obtaining optical data, and commands instructing timing for data communication, via the first communication channel from the camera microprocessor 205. The lens microprocessor 111 obtains the optical data requested by the camera microprocessor 205, based on commands instructing timing for obtaining the optical data. This is then stored in the transmission data buffer 333 of the second lens communication unit 112b along with the registration No. received from the camera microprocessor 205. In a case where the camera microprocessor 205 has requested multiple optical data sets, each optical data set is sequentially obtained based on the specified timing, and stored in the transmission data buffer 333.

Once all optical data requested by the camera microprocessor 205 is stored in the transmission data buffer 333, the buffer control unit 318 causes the transmission data buffer 333 to output the data to be transmitted, one byte at a time, based on the commands for instructing the timing for the above-described data transmission. The transmission parallel/serial converter 332 converts the optical data that is parallel data into serial data, and also converts into a later-described asynchronous communication format, and outputs to the second lens-camera communication line (DLC2).

The camera microprocessor 205 converts the optical data that is the received serial data at the reception serial/parallel converter 331 of the second camera communication unit 208b into parallel data, and extracts the body of the optical data from the asynchronous communication format. The buffer control unit 313 then stores the extracted optical data in the data reception buffer 330. As described above, communication of transmission request commands for optical data from the camera microprocessor 205 to the lens microprocessor 111 via the first communication channel, and transmission of optical data from the lens microprocessor 111 to the camera microprocessor 205 via the second communication channel, is performed.

4. Communication Format (FIGS. 4A Through 4B2)

Next, the communication formats on the first communication channel and second communication channel will be described with reference to FIGS. 4A through 4B2.

4-1. Clock Synchronization Communication

FIG. 4A illustrates an example of a communication format of the clock synchronous communication performed on the first communication channel. In FIG. 4A, clock signals transmitted/received at the clock channel (LCLK), data signals transmitted/received at the camera-lens transmission channel (DCL), and signal waveforms of data signals transmitted/received at the first lens-camera transmission channel (DLC), are illustrated in order from above. In the following description, clock signals will be referred to as clock signals LCLK signals, data signals transmitted/received on the camera-lens transmission channel (DCL) will as DCL signals, and data signals transmitted/received on the first lens-camera transmission channel (DLC) as DLC signals.

The first camera communication unit 208a outputs LCLK signals, and also outputs 8-bit data of B7 through B0 as DCL signals, so as to match the leading edge of the LCLK signals. The first lens communication unit 112a detects the LCLK signals, and also outputs 8-bit data of B7 through B0 as DLC signals, so as to match the leading edge of the LCLK signals.

The first camera communication unit 208a receives the 8-bit B7 through B0 DLC signals, so as to match the leading edge of the LCLK signals. The first lens communication unit 112a receives the 8-bit B7 through B0 DCL signals, so as to match the leading edge of the LCLK signals. Thus, control is effected so as to perform communication between the first camera communication unit 208a and first lens communication unit 112a at timings corresponding to clock signals output from the first camera communication unit 208a via the clock communication line at the first communication channel. Accordingly, the camera microprocessor 205 and lens microprocessor 111 can exchange data over the first communication channel.

Also, the first lens communication unit 112a that has received the 8-bit data of B7 through B0 DCL signals holds the LCLK signal at Low for a predetermined time Tbusy, and releases the Low when the predetermined time Tbusy elapses. The predetermined time Tbusy is time necessary to process the received data at the lens microprocessor 111, and the camera microprocessor 205 does not transmit data to the lens microprocessor 111 during this time. Communication of multiple bytes between the camera microprocessor 205 and lens microprocessor 111 on the first communication channel is performed by repeating communication processing according to this communication format.

4-2. Asynchronous Communication (FIGS. 4B1 and 4B2)

FIG. 4B1 illustrates a communication format example of asynchronous communication performed over the second communication channel. An example is illustrated here where a 1-bit start bit, an 8-bit data bit, and a 1-bit stop bit, making up ten bits form one frame, as the format of data that is communicated. Note that the data bits in the present embodiment are only exemplary. The data bits may be seven bits or 16 bits, for example, and a parity bit may be included. Alternatively, the stop bit may be two bits.

FIG. 4B2 illustrates a timing synchronization method in the asynchronous communication over the second communication channel. The camera microprocessor 205 and lens microprocessor 111 transmit/receive data by operating internal clocks according to a clock frequency, i.e., clock rate, that both have agreed on. For example, the internal clock is set to a clock rate that is 16 times the communication rate between the camera microprocessor 205 and lens microprocessor 111. The start point of data sampling is decided to be sampling at the internal clock of the trailing edge of the start bit in the received data, so that this can be shown as synchronization timing in FIG. 4B2. This data at the position of eight clocks starting at this synchronization timing is latched, so that this can be shown as data sampling timing in FIG. 4B2. Accordingly, data can be read at the middle of each bit. Performing data sampling in this way for each bit enables data communication to be performed over only the one second lens-camera communication line (DLC2).

5. Main Flowchart (FIG. 11)

FIG. 11 illustrates a main flowchart, showing the flow of processing that the camera microprocessor 205 and lens microprocessor 111 perform. S in FIG. 11 means "step".

5-1. Processing by Camera Microprocessor 205 (FIG. 11A)

First, the processing that the camera microprocessor 205 performs will be described with reference to FIG. 11A. The camera microprocessor 205 starts processing from a state where the interchangeable lens 100 has not been mounted to the camera body 200, in step S2001. In S2002, the camera microprocessor 205 determines whether or not the interchangeable lens 100 has been mounted to the camera body 200, and if mounted, the flow advances to S2003.

In S2003, the camera microprocessor 205 starts supply of power source to the interchangeable lens 100. Accordingly, the lens microprocessor 111 and the actuators in the interchangeable lens 100 can operate.

Next, in S2004, the camera microprocessor 205 performs initial communication processing with the lens microprocessor 111. This initial communication processing will be described later.

Next, in S2005, the camera microprocessor 205 performs steady communication processing with the lens microprocessor 111. This steady communication processing is processing that is performed when the camera body 200 is performing steady operations (live view display, etc.), and will be described in detail later.

In S2021, the camera microprocessor 205 determines whether or not a release operation has been accepted from the user. In a case where a release operation has been accepted from the user by the camera microprocessor 205, communication processing for release is performed in S2022. Details will be described later with reference to FIGS. 10A and 10B. On the other hand, in a case where no release operation has been accepted from the user by the camera microprocessor 205, the flow transitions to S2006.

Next, in S2006, the camera microprocessor 205 determines whether or not conditions are satisfied for sleep processing. Determination is made regarding whether or not an auto power off time that the user has set has elapsed, as an example in the present embodiment. If the conditions are satisfied, the flow advances to S2007, otherwise, the flow returns to S2005.

In S2007, the camera microprocessor 205 performs communication (sleep request) to transition the lens microprocessor 111 to a sleep state, and the camera microprocessor 205 itself also transitions to a sleep state.

Next, in S2008, the camera microprocessor 205 that is in a sleep state determines whether or not a sleep state canceling factor has occurred. Determination is made regarding whether or not the camera operating unit 207 has been operated, as an example in the present embodiment. In a case where a sleep state canceling factor has occurred, the flow returns to S2005 and steady communication processing is resumed.

Figure 11B:
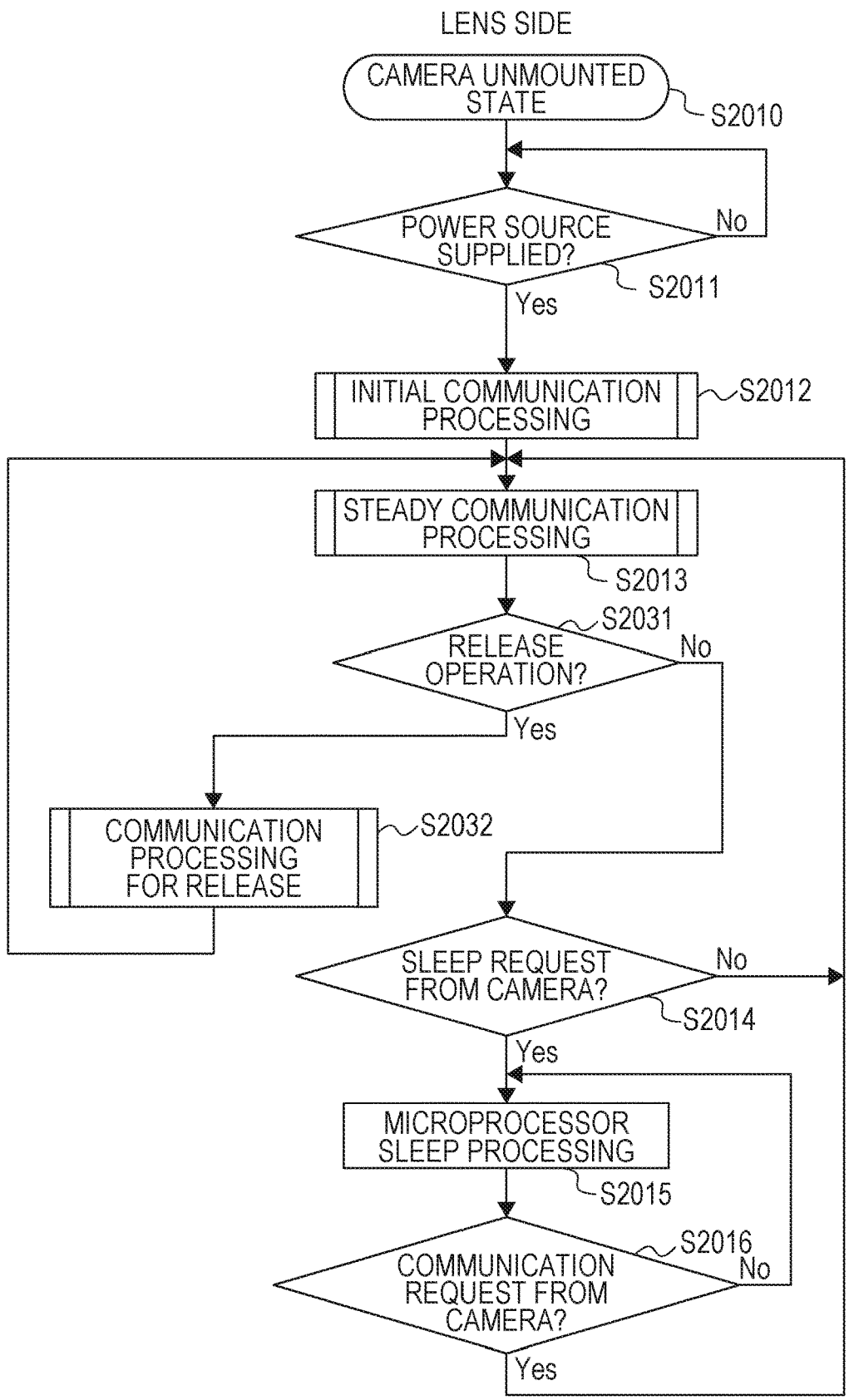
FIG. 11B is a main flowchart illustrating overall processing of a lens microprocessor according to the first embodiment.

5-2. Processing by Lens Microprocessor 111 (FIG. 11B)

The processing performed at the lens microprocessor 111 will be described next. The lens microprocessor 111 starts the flow from a state where the interchangeable lens 100 is not mounted to the camera body 200 in S2010. In S2011, the lens microprocessor 111 determines whether or not power source supply from the camera body 200 has started. Once power source supply has started, the lens microprocessor 111 performs initial communication processing in S2012. The initial communication processing will be described later in detail.

In S3013, the lens microprocessor 111 performs steady communication processing. This steady communication processing will be described later in detail.

Figure 10A:
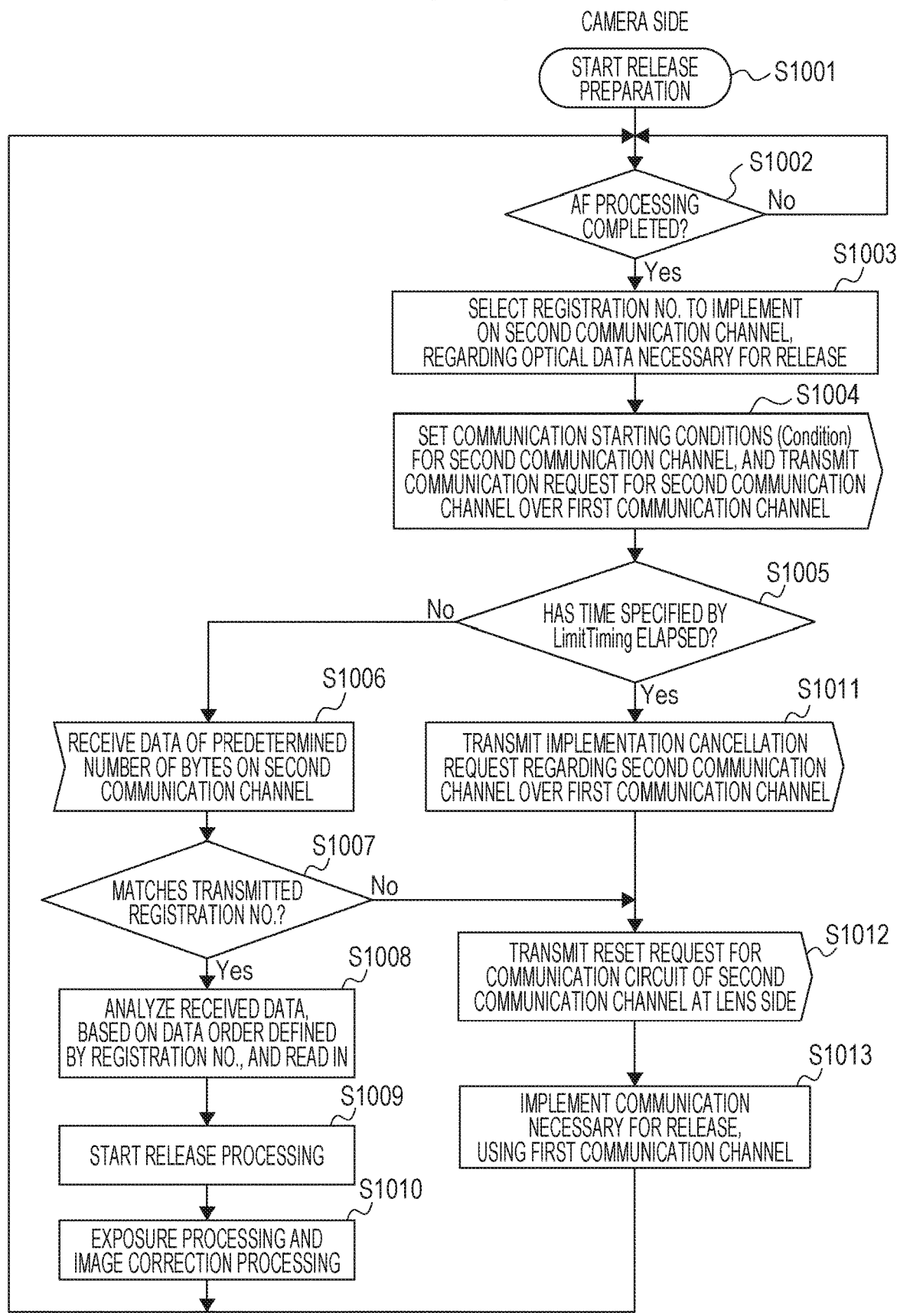
FIG. 10A is a flowchart illustrating release preparation processing that the camera microprocessor performs over the second communication channel in the second embodiment.
Figure 10B:
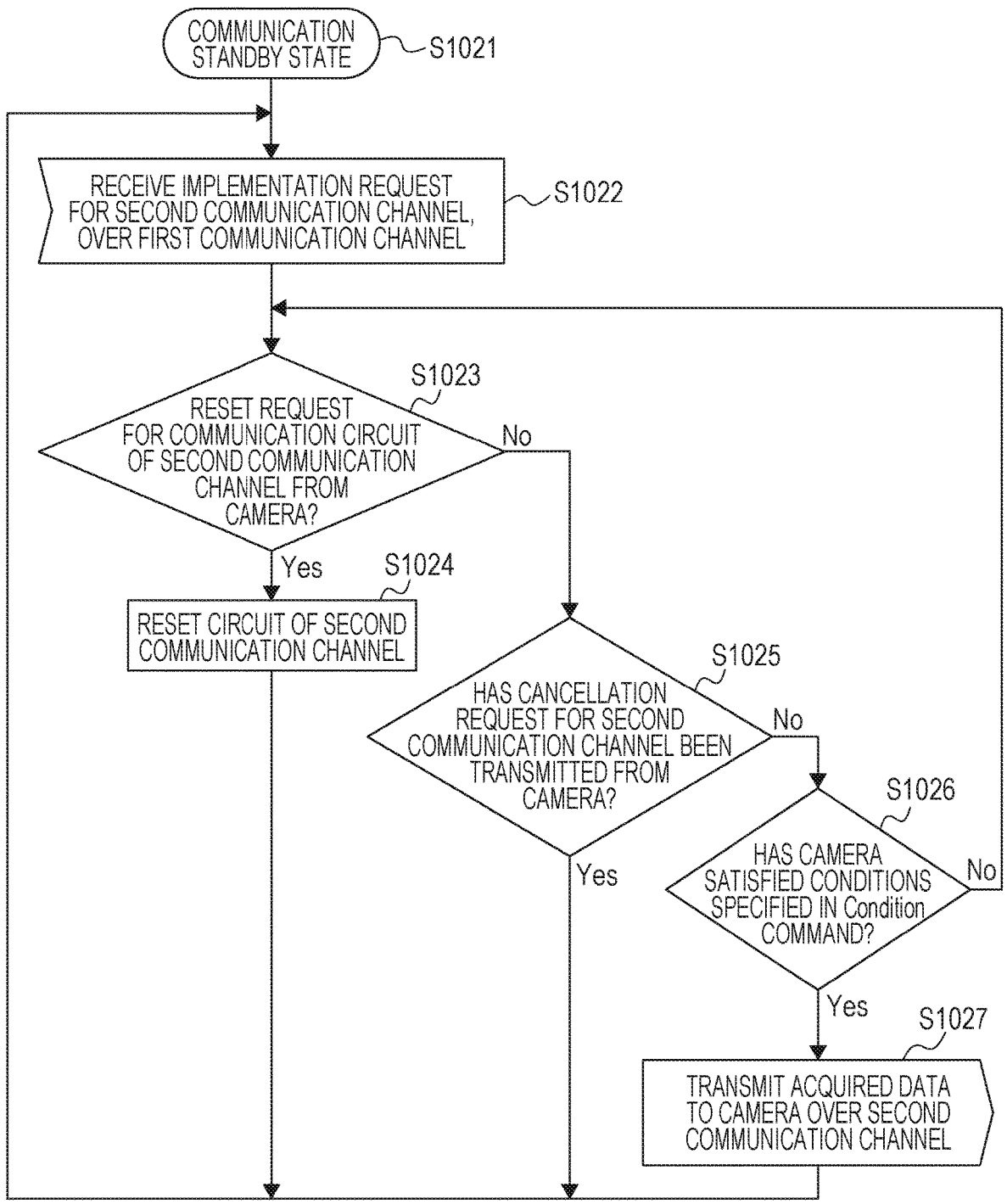
FIG. 10B is a flowchart illustrating release preparation processing that the lens microprocessor performs over the second communication channel in the second embodiment.

In S2031, determination is made whether or not the camera body 200 has received in S2022 a communication request for when performing communication processing for release, which will be described later with reference to FIGS. 10A and 10B. In a case where this request has been accepted, the interchangeable lens 100 also performs communication processing for release described later with reference to FIGS. 10A and 10B, in S2032. If no user operation has been accepted for release, the flow transitions to S2014.

Further, in S2014, the lens microprocessor 111 determines whether or not a sleep request has been received from the camera microprocessor 205. In a case of having received a sleep request, in S2015 the lens microprocessor 111 performs processing to transition the lens microprocessor 111 itself to a sleep state. In a case where a sleep request has not been received, the lens microprocessor 111 returns to S2013.

In S2016, the lens microprocessor 111 in a sleep state determines whether or not there has been a communication request from the camera microprocessor 205, and in a case where there has been a communication request, the sleep state is cancelled, and the lens microprocessor 111 returns to S2013 and resumes steady communication processing.

6. Initial Communication Processing (FIGS. 5A, 5B, and 12)

Figure 5A:
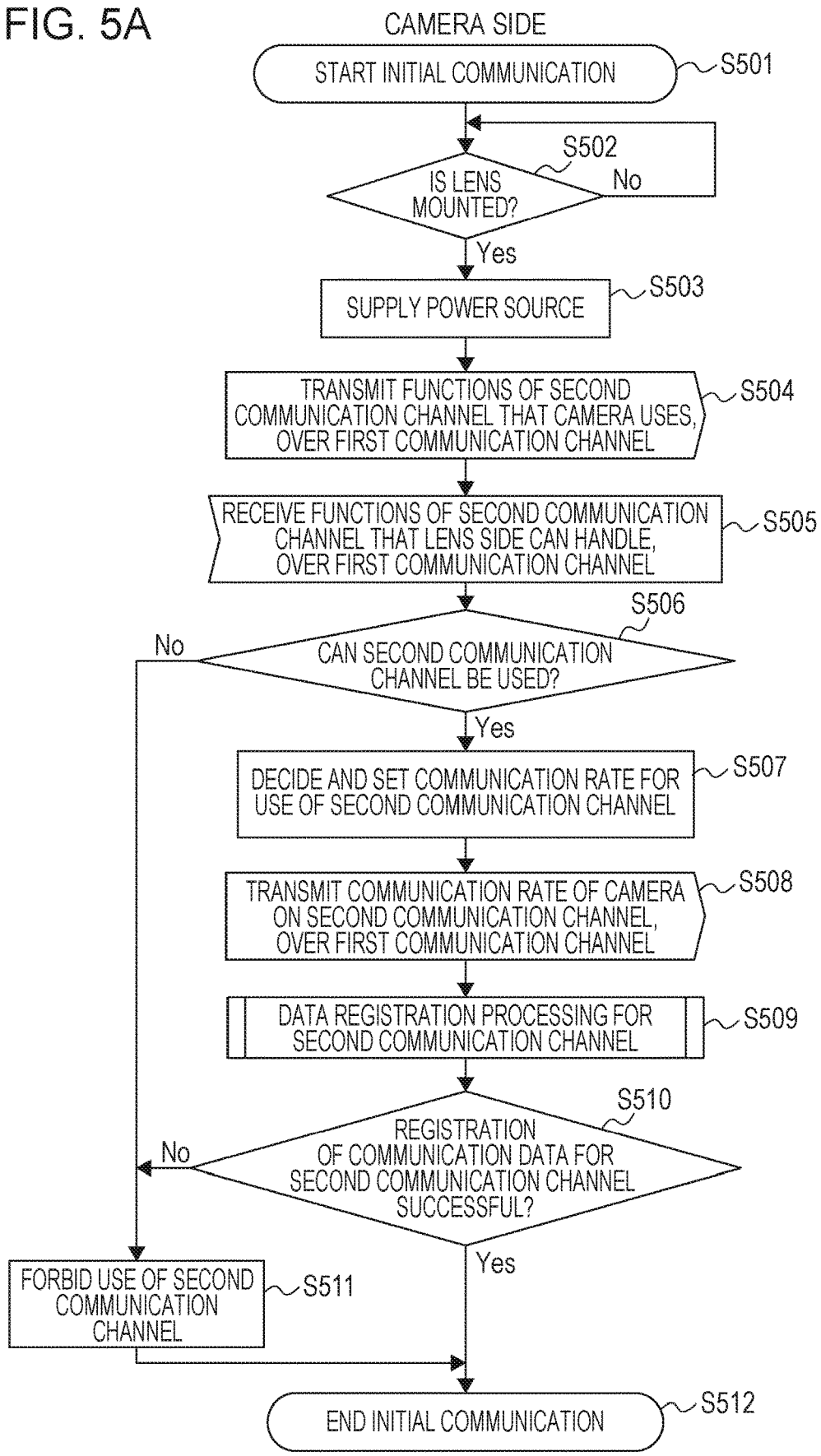
FIG. 5A is a flowchart illustrating initial communication processing that a camera microprocessor performs in the first embodiment.
Figure 5B:
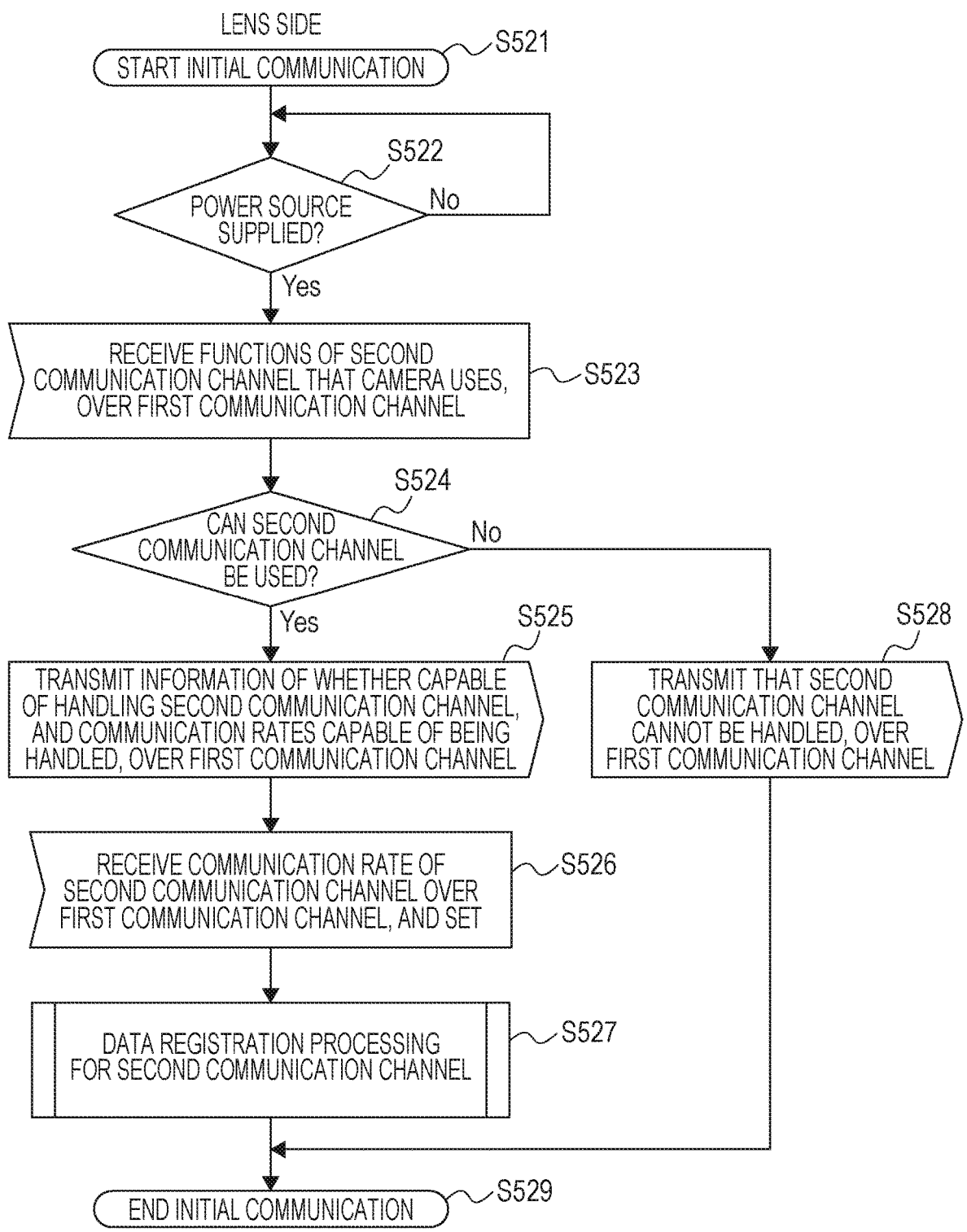
FIG. 5B is a flowchart illustrating initial communication processing that the lens microprocessor performs in the first embodiment.

Next, the flowcharts in FIGS. 5A and 5B will be used to describe the initial communication processing performed by the camera microprocessor 205 and lens microprocessor 111 in S2004 and S2012 in FIG. 11.

6-1. Initial Communication Processing by Camera Microprocessor 205 (FIGS. 5A and 12)

First, the initial communication processing that the camera microprocessor 205 performs will be described with reference to the flowchart in FIG. 5A. An example of a specific command illustrated in FIG. 12 will be used for description here.

The camera microprocessor 205 that has started up in S501 determines in S502 whether or not the interchangeable lens 100 has been mounted to the camera body 200, and in a case where the interchangeable lens 100 has been mounted, advances to S503.

In S503, the camera microprocessor 205 starts power source supply to the interchangeable lens 100. This enables the camera microprocessor 205 and lens microprocessor 111 to communicate.

Next, in S504, the camera microprocessor 205 transmits a communication rate capable information notification command for the second communication channel (0xAA in hexadecimal) shown in FIG. 12 to the lens microprocessor 111. This is to notify that the camera microprocessor 205 has capabilities to use the second communication channel. In the following description, assumption will be made that a communication rate 1 through communication rate 8 have been decided between the camera microprocessor 205 and lens microprocessor 111, corresponding to each of bit 0 through bit 7, as the communication rate definitions shown in FIG. 13. Of the communication rate 1 through communication rate 8, communication rate 1 is the slowest communication rate, and communication rate 8 is the fastest communication rate. Definition has been made such that the speed increases from communication rate 1 toward communication rate 8.

In the present embodiment, an assumption will be made that the camera microprocessor 205 handles communication rates of communication rate 1 through communication rate 5. The camera microprocessor 205 transmits to the lens microprocessor 111 communication rate information in which bit 0, bit 1, bit 2, bit 3, and bit 4, corresponding to communication rate 1, communication rate 2, communication rate 3, communication rate 4, and communication rate 5, are enabled, as communication rate information, i.e., 0x1F in hexadecimal following the communication rate capable information notification command (0xAA in hexadecimal). In a case where the camera side cannot use the second communication channel, communication rate information in which bit 0 through bit 7 has all been invalidated, i.e., 0x00 in hexadecimal is transmitted to the lens microprocessor 111 following the communication rate capable information notification command (0xAA in hexadecimal).

In S505, the camera microprocessor 205 obtains communication rate information that is usable on the second communication channel from the lens microprocessor 111. In the present embodiment, assumption will be made that the lens microprocessor 111 can handle communication rate 1, communication rate 2, and communication rate 3. In this case, the lens microprocessor 111 transmits to the camera microprocessor 205 communication rate information in which bit 0, bit 1, and bit 2, corresponding to communication rate 1, communication rate 2, and communication rate 3 are enabled, i.e., 0x07 in hexadecimal.

Next, in S506, determination is made regarding whether or not the second communication channel can be used. In the present embodiment, the camera microprocessor 205 determines whether or not the second communication channel can be used from the communication rate information obtained from the lens microprocessor 111 in S505. Specifically, in a case where no valid bit is included in the communication rate information received from the lens microprocessor 111 in S505, determination is made that the second communication channel cannot be used. Cases where the second communication channel cannot be used includes cases where the communication rates that the lens microprocessor 111 can use and the communication rates that the camera microprocessor 205 can use do not match, and cases where the lens microprocessor 111 cannot handle the second communication channel. In a case where the second communication channel can be used, the camera microprocessor 205 advances to S507, and in a case where the second communication channel cannot be used, advances to S511 and forbids use of the second communication channel, and ends the initial communication processing in S512.

In S507, the camera microprocessor 205 decides the usage communication rate on the second communication channel from the communication rate information obtained from the lens microprocessor 111 in S505, and sets that information in the second camera communication unit 208b.

Figure 13:
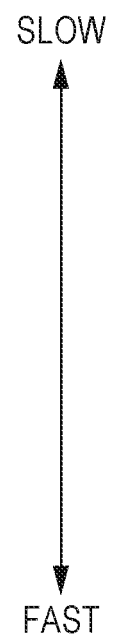
FIG. 13 is a diagram illustrating communication rate definitions according to the first embodiment.

Then in S508, the camera microprocessor 205 transmits the usage communication rate that has been decided in S507 to the lens microprocessor 111 over the camera-lens communication line (DCL) of the first communication channel, in the bit expression shown in FIG. 13. The camera microprocessor 205 at this time decides the communication rate 3, which is the fastest communication rate that both the camera microprocessor 205 and the lens microprocessor 111 can use, to be the usage communication rate. The camera microprocessor 205 then transmits a usage communication rate communication command for the second communication channel (0xCC), and 0x04 representing communication rate 3, to the lens microprocessor 111.

In S509, the camera microprocessor 205 then performs data registration processing for registering a definition of optical data (hereinafter referred to as "optical data definition" at the lens microprocessor 111, described later in detail) to be transmitted to the lens microprocessor 111 over the second communication channel. The camera microprocessor 205 transmits a data registration request command to the lens microprocessor 111 in the data registration processing, thereby causing the lens microprocessor 111 to also perform data registration processing. This will be described in detail later with reference to FIG. 5C.

Then in S510, the camera microprocessor 205 determines whether or not data registration processing has been successful in S509, and if successful, advances to S512 and completes the initial communication processing at the camera microprocessor 205. Note that in a case where determination has been made in S506 that the second communication channel cannot be used, and in a case where determination has been made in S510 that data registration processing has failed, the camera microprocessor 205 forbids usage of the second communication channel in S511, and completes the initial communication processing in S512.

6-2. Initial Communication Processing by Lens Microprocessor 111 (FIGS. 5B and 12)

Next, the initial communication processing performed at the lens microprocessor 111 in response to the initial communication processing of the camera microprocessor 205 described above will be described with reference to the flowchart in FIG. 5B.

In S521, the lens microprocessor 111 that has started the initial communication processing awaits supply of power source from the camera microprocessor 205 in S522.

In S523, the lens microprocessor 111 receives the communication rate capable information notification command transmitted from the camera microprocessor 205 (0xAA) and the communication rate information (0x1F) of the communication rates that the camera can use.

In S524, the lens microprocessor 111 determines whether or not the second communication channel can be used, based on the communication rate information obtained from the camera microprocessor 205 in S523 and the communication rate information that the lens microprocessor 111 can use on the second communication channel. If the second communication channel can be used, the lens microprocessor 111 advances to S525, and if not usable (the lens microprocessor 111 cannot handle the functions of the second communication channel), advances to S528. Note that determination of whether or not the second communication channel can be used may be made using identification information of the camera, for example, in the same way as in the description of S506.

In S525, the lens microprocessor 111 transmits information of communication rates that can be used on the second communication channel to the camera microprocessor 205. The lens microprocessor 111 here transmits information in which bit 0, bit 1, and bit 2, corresponding to communication rate 1, communication rate 2, and communication rate 3 are enabled, as communication rate information (0x07), to the camera microprocessor 205, as described in S505.

In S526, the lens microprocessor 111 then receives the usage communication rate information of the second communication channel transmitted by the camera microprocessor 205 in S508, and sets this to the second lens communication unit 112b.

Further, in S527, the lens microprocessor 111 performs data registration processing for registering optical data definitions to be transmitted to the camera microprocessor 205, in response to receiving a data registration request command from the camera microprocessor 205 as described in S509. Details of this data registration processing will be described later with reference to FIG. 5D. Thereafter, the lens microprocessor 111 advances to S529, and ends the initial communication processing.

On the other hand, in S528, the lens microprocessor 111 performs processing for a case where the second communication channel is not usable (cannot handle the second communication channel). Specifically, the lens microprocessor 111 clears all bits indicating communication rates that can be used on the second communication channel, shown in FIG. 13, and transmits 0x00 to the camera microprocessor 205 as a communication rate capable information obtaining command shown in FIG. 12. Thereafter, the lens microprocessor 111 advances to S529 and ends the initial communication processing.

7. Data Registration Processing (FIGS. 5C, 5D, 6, and 14)

Figure 5C:
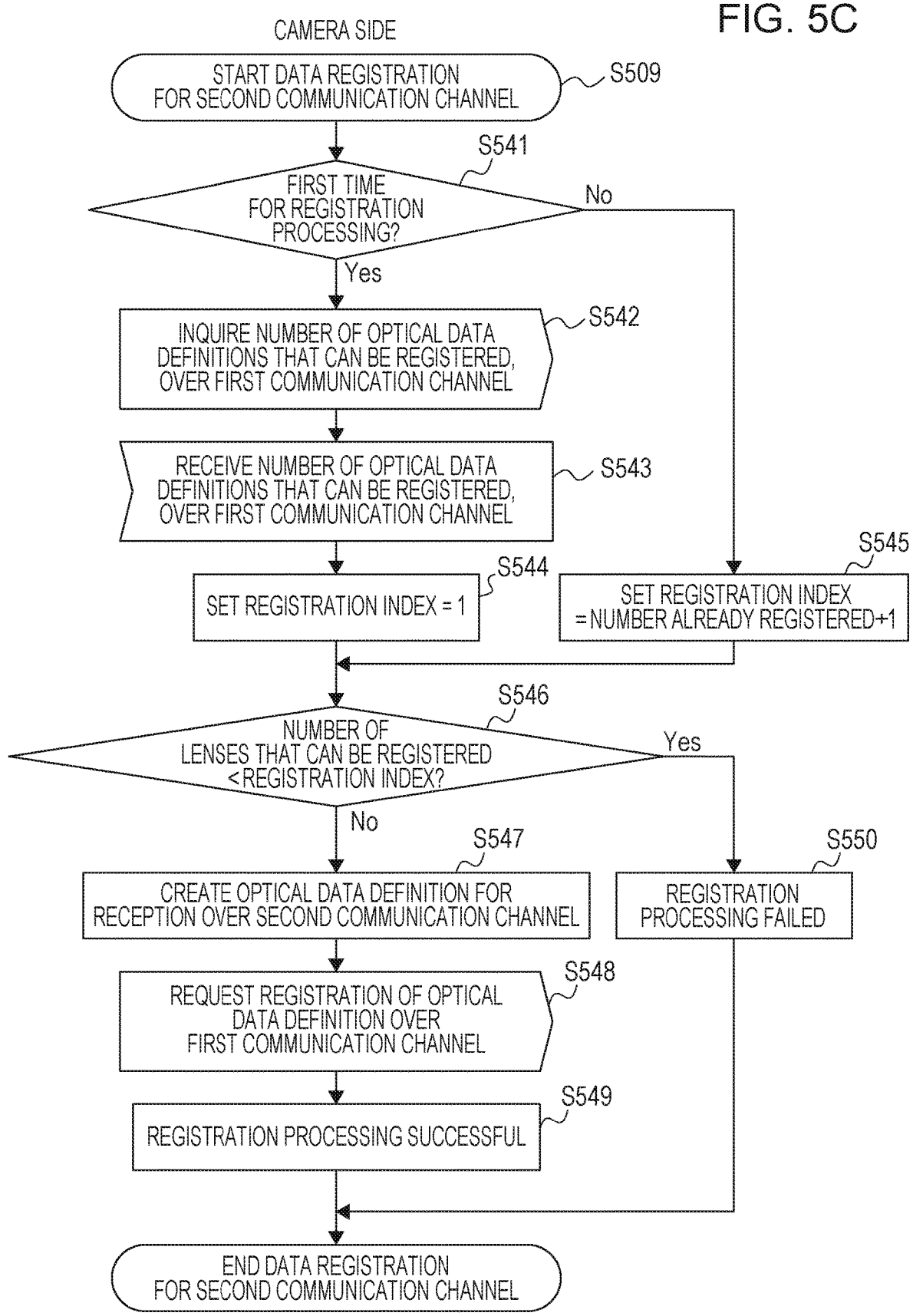
FIG. 5C is a flowchart illustrating registration data processing that the camera microprocessor performs in the first embodiment.

Next, data registration processing that the camera microprocessor 205 and lens microprocessor 111 perform in S509 and S527 respectively will be described with reference to the flowcharts in FIGS. 5C and 5D.

7-1. Data Registration Processing by Camera Microprocessor 205 (FIGS. 5C, 6, and 14)

First, the data registration processing that the camera microprocessor 205 performs will be described with reference to the flowchart in FIG. 5C. In S541, the camera microprocessor 205 determines whether or not this is the first time of performing data registration processing for the lens microprocessor 111 of the interchangeable lens 100 that is mounted. In a case where this is the first time to perform data registration processing for the lens microprocessor 111, the camera microprocessor 205 advances to S542, and if data registration processing has already been performed, advances to S545.

In S542, the camera microprocessor 205 makes inquiry to the lens microprocessor 111 regarding the number of optical data definitions that can be registered, via the first communication channel. In S543, the camera microprocessor 205 obtains the number that can be registered, as a reply from the lens microprocessor 111.

Next, in S544, the camera microprocessor 205 sets a registration index to "1". On the other hand, in S545, the registration index is set to "number already registered +1".

Next, in S546, the camera microprocessor 205 determines whether or not the number set in the registration index exceeds the number that can be registered, obtained in S543. In a case where the number set in the registration index exceeds the number that can be registered, the camera microprocessor 205 advances to S550 where data registration processing is determined to have failed, and ends the data registration processing. In a case where the number set in the registration index does not exceed the number that can be registered, the camera microprocessor 205 advances to S547.

In S547, the camera microprocessor 205 creates an optical data definition indicating the type and transmission order of optical data that is to be transmitted from the lens microprocessor 111 over the second communication channel. Specifically, an optical data definition is created by correlating a registration No. of the optical data definition, the type of optical data, and the transmission order, as illustrated in FIG. 14. Information that has been registered in order for optical data to be transmitted from the lens microprocessor 111 over channel 2 is also referred to as "registration information", with type and transmission order of optical data being examples of registration information.

For example, correlated with registration No. 1 are optical data "focal length information (2)", "aperture diameter information (3)", "focus position information (2)", "zoom position information (2)", "gyro information (20)", and "focus correction information (100)", in this transmission order. Correlated with registration No. 2 are "focus position information (2)" and "correction information (100)", in this transmission order. Correlated with registration No. 3 are "focal length information (2)", "aperture diameter information (3)", "zoom position information (2)", and "current aperture position information (3)", in this transmission order. Correlated with registration No. 4 are "gyro information (20)" and "tripod fixation determination information (1)", in this transmission order. Note that the values in the parentheses for each kind of information indicate the data length (bytes) for expressing the information thereof. Note that these optical data definitions are only examples, and may include other optical data (information).

Note that there are two kinds of optical data that is transmitted from the lens microprocessor 111 over the second communication channel. One is that obtained by the lens microprocessor 111 by detecting the optical data itself, and the other is obtained by generating using other optical data or the like. As an example, "focus correction information (100)", "current aperture position information (3)", and "tripod fixation determination information (3)" are optical data generated from other optical data in the present embodiment.

In a case where the combination of optical data correlated differs between one registration No. and another registration No., for example, part of the correlated optical data may overlap. Also, there may be cases where the combinations of correlated optical data are the same, but the order of correlation differs, for example. That is to say, it is sufficient for at least one of the combination of correlated optical data and the order to differ between one registration No. and another registration No.

In S548, the camera microprocessor 205 transmits an optical data definition created in S547, along with the data registration request command, to the lens microprocessor 111 via the first communication channel. The communication processing at this time will be described with reference to FIG. 6.

FIG. 6 illustrates signal waveforms of a clock signal line (LCLK) 601, camera-lens communication line (DCL) 602, and first lens-camera communication line (DLC) 603, making up the first communication channel. A case of registering N optical data definitions is illustrated here, showing registration processing 604 of a first optical data definition (No. 1), registration processing 605 of a second optical data definition (No. 2), and registration processing 606 of an N'th optical data definition (No. 3).

In the registration processing 604, the camera microprocessor 205 transmits a data registration request command (0xDD in FIG. 12) 610 to the lens microprocessor 111. Next, the camera microprocessor 205 transmits an entry No. 611 indicating the registration No. to be registered, to the lens microprocessor 111. An entry No. command "1" corresponding to the registration No. 1 is transmitted here. The camera microprocessor 205 then transmits a count command 612 indicating the number of optical data definitions that should be registered, "0x0A in a case where the number is ten, as shown in FIG. 12, for example, to the lens microprocessor 111. The camera microprocessor 205 then transmits the optical data to be included in the optical data definitions to the lens microprocessor 111 as first registration command (613) through n'th registration command (614), and finally transmits a checksum 615 to the lens microprocessor 111 to guarantee the data.

Upon receiving the data registration request command from the camera microprocessor 205, the lens microprocessor 111 transmits a response "00" to the camera microprocessor 205. Further, each time the aforementioned command is received, the lens microprocessor 111 transmits responses "Ack" 616 and 617 to the camera microprocessor 205, for confirmation of the reception. Finally, the lens microprocessor 111 receives the checksum 615 from the camera microprocessor 205, and thus transmits a response for confirmation thereof to the camera microprocessor 205. The registration processing described above is performed for all optical data definitions (No. 1 through No. N).

The camera microprocessor 205 that has performed the data registration request processing in S548 by the above-described processing advances to S549 and determines the data registration processing to have been successful, and ends this processing.

7-2. Data Registration Processing by Lens Microprocessor 111 (FIG. 5D)

Next, the data registration processing performed by the lens microprocessor 111 will be described with reference to the flowchart in FIG. 5D. In S561, the lens microprocessor 111 determines whether or not this is the first time to perform data registration processing with the camera microprocessor 205, and advances to S562 if the first time, and to S565 if data registration processing has already been performed.

In S562, the lens microprocessor 111 receives an inquiry from the camera microprocessor 205, regarding the number of optical data definitions that can be registered. The lens microprocessor 111 responds with the number that can be registered to the camera microprocessor 205 in S563. At this time, the lens microprocessor 111 decides the number that can be registered in accordance with the capacity of the storage area storing optical data, such as RAM or the like within the interchangeable lens 100.

Next, in S564, the lens microprocessor 111 sets the registration index for finalizing an address in the storage region to "1". On the other hand, in S565, the registration index is set to "number already registered+1".

Next, in S566, the lens microprocessor 111 receives the data registration request command that the camera microprocessor 205 has transmitted in S548.

Next, in S567, the lens microprocessor 111 stores the optical data corresponding to registration commands 1 through n transmitted from the camera microprocessor 205, to addresses in the storage region offset in accordance with the registration index, with the head address as a reference. This processing ends the data registration processing for the lens microprocessor 111.

Figure 7:
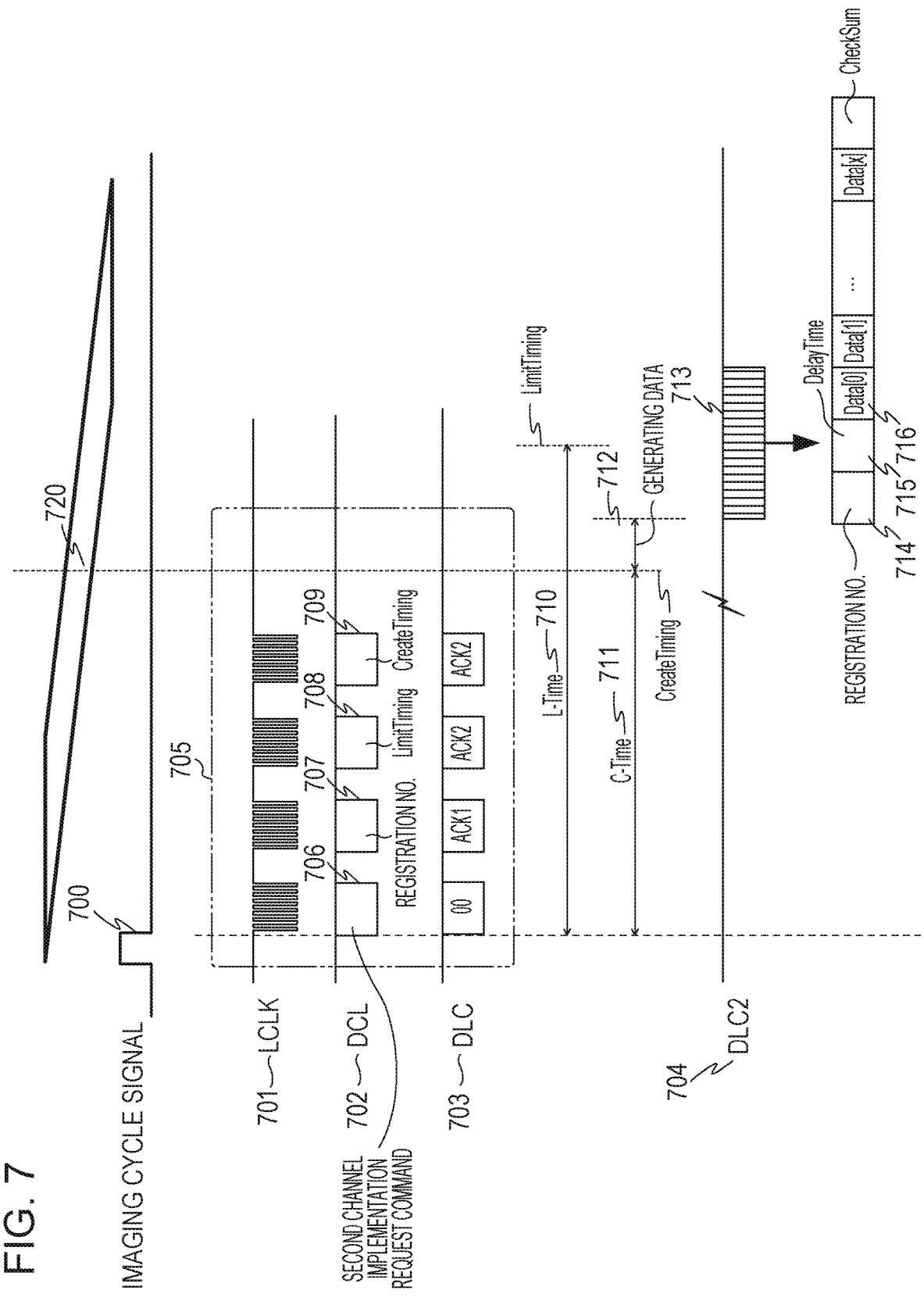
FIG. 7 is a timing chart of communication processing that the camera microprocessor performs over a second communication channel according to the first embodiment.

8. Timing Chart of Communication Processing on Second Communication Channel (FIG. 7)

Next, communication processing performed when the camera microprocessor 205 and lens microprocessor 111 communicate over the second communication channel will be described with reference to a timing chart in FIG. 7. FIG. 7 illustrates signal waveforms of a clock channel (LCLK) 701, camera-lens transmission channel (DCL) 702, and first lens-camera communication channel (DLC) 703, making up the first communication channel. Also illustrated is the signal waveforms on the second lens-camera transmission channel (DLC2) 704 making up the second communication channel.

A case will be described here regarding performing communication over the second communication channel at an imaging start timing 700 for live view images or shooting moving images. Note however, that communication may be made over the second communication channel in cases of performing imaging other than live view images or shooting moving images.

The camera microprocessor 205 is triggered by the imaging start timing 700, and performs second channel communication request processing 705 over the first communication channel, to request the lens microprocessor 111 for communication over the second communication channel. The camera microprocessor 205 transmits a second channel communication request command (0xE0 in FIG. 12) 706, requesting communication over the second communication channel, to the lens microprocessor 111 in this second channel request processing 705. Subsequently, the camera microprocessor 205 transmits a registration No. command (e.g., 0x01 indicating registration No. 1) 707 indicating the registration No. of the optical data definition corresponding to the optical data regarding which transmission over the second communication channel is to be requested, and a LimitTiming command 708, and further a CreateTiming command 709, to the lens microprocessor 111. Thus, a 4-byte communication configuration is exemplified in the present embodiment.

The registration No. command 707 is a registration No. corresponding to data that the camera microprocessor 205 requests of the lens microprocessor 111. The LimitTiming command 708 is information of time that the camera microprocessor 205 specifies, and indicates the time limit until the time LimitTiming at which the lens microprocessor 111 should start transmission of optical data on the second communication channel. The lens microprocessor 111 must start transmission of the optical data to the camera microprocessor 205 within limit time L-Time specified in the LimitTiming command 708, starting from the time of having received the second channel communication request command 706.

Thus, the limit time L-Time in the present embodiment is the time limit by which the lens microprocessor 111 should start transmission of the optical data over the second communication channel to the camera microprocessor 205. Note however, that this is only one example, and that the limit time L-Time may be the time limit by which the lens microprocessor 111 should complete transmission of the optical data over the second communication channel to the camera microprocessor 205, for example. Also, as an example in the present embodiment, if the LimitTiming 708 is 0x64 as illustrated in FIG. 12, the lens microprocessor 111 performs communication over the second communication channel after having received the second channel communication request command 706 but before the limit time L-Time elapses therefrom. Note that an arrangement may be made where, in a case of 0 ms being specified in the LimitTiming command, no limit time is set for execution of communication over the second communication channel.

Upon having received the second channel communication request command 706, registration No. command 707, and LimitTiming command 708, the lens microprocessor 111 transmits "00", "ACK1", and "ACK2" to the camera microprocessor 205 as responses thereto.

The lens microprocessor 111 that has received the registration No. command 707 performs communication processing over the second communication channel before the limit time L-Time elapses. Specifically, the lens microprocessor 111 transmits optical data 709 correlated with a registration No. to the camera microprocessor 205 in the registered transmission order, along with a response (registration No.) confirming the registration No. indicated in the registration No. command 707. Transmitting optical data including the response for confirming the registration No. (e.g., the same No. as the registration No. shown in the registration No. command 707) enables the camera microprocessor 205 to confirm that the optical data specified in the registration No. command 707 is being received.

The CreateTiming command 709 is information of time that the camera microprocessor 205 specifies, and indicates the standby time until the CreateTiming which is time where the lens microprocessor 111 should start obtaining optical data specified in the registration No. command 707. In the present embodiment, the lens microprocessor 111 start obtaining of optical data at time 712 that is equivalent to CreateTiming where the standby time C-Time specified in the CreateTiming command 709 has elapsed, starting from the time of having received the second channel communication request command 706. After having obtained the optical data, the lens microprocessor 111 transmits the obtained optical data over the second communication channel. More specifically, the camera microprocessor 205 parametrizes the CreateTiming command 709, to 8 ms for example, in the communication request for the second communication channel in FIG. 12, and communicates this to the lens microprocessor 111.

For example, in the present embodiment, the camera microprocessor 205 sets the standby time C-Time by the CreateTiming command 709, so that the timing equivalent to an imaging accumulation center-of gravity 720 is the CreateTiming. Accordingly, optical data can be obtained at accumulation center-of gravity time of the camera. Also, optical data generated based on optical data obtained at the accumulation center-of gravity time of the camera can be obtained.

The advantages of obtaining optical data obtained/generated at the accumulation center-of gravity time of the camera will be described. The control units of the camera body 200 effect control based on signal information at the time of imaging. Aberration correction of an image obtained by imaging will be described as an example. The camera microprocessor 205 saves an aberration correction data table, taking into consideration optical properties of the lenses, in memory (omitted from illustration). When performing aberration correction, the camera microprocessor 205 may search the table using information such as the focal position, zoom position, maximum aperture, and so forth, and calculate correction values of aberration correction. In such a case, highly-precise correction can be performed by performing table searching processing using information of the lens at the center-of-gravity of imaging. Note that the standby time C-Time that the camera microprocessor 205 sets is a time shorter than the limit time L-Time.

Second channel transmission processing 713 is processing where communication of optical data from the lens microprocessor 111 is performed over the second communication channel, as a response to the second channel communication request processing 705 from the camera microprocessor 205 via the first communication channel. The data transmitted in the second channel transmission processing 713 includes registration No. command 714, DelayTime command 715, and optical data 716.

The registration No. command 714 is a registration No. requested from the camera microprocessor 205, and is included in data communicated from the lens microprocessor 111 to the camera microprocessor 205. Communicating this registration No. along with the data can guarantee that the data requested by the camera microprocessor 205 is being transmitted.

The DelayTime command 715 is time that the camera microprocessor 205 specifies, and indicates delay time (also referred to as DelayTime) of the actual obtaining timing as to the obtaining timing of optical data based on the CreateTiming command 709. This delay time preferably is zero, but there may be cases where delay occurs due to control at the lens microprocessor 111. In a case where delay occurs, the camera microprocessor 205 can perform interpolation approximation of the optical data at the CreateTiming specified by the CreateTiming command 709, using this delay time.

The optical data 716 (Data[0] through Data[x]) stores optical data in the order of request by the registration No. command 707, and is communicated.

9. Flowchart of Communication Processing on Second Communication Channel (FIG. 8)

Figure 8A:
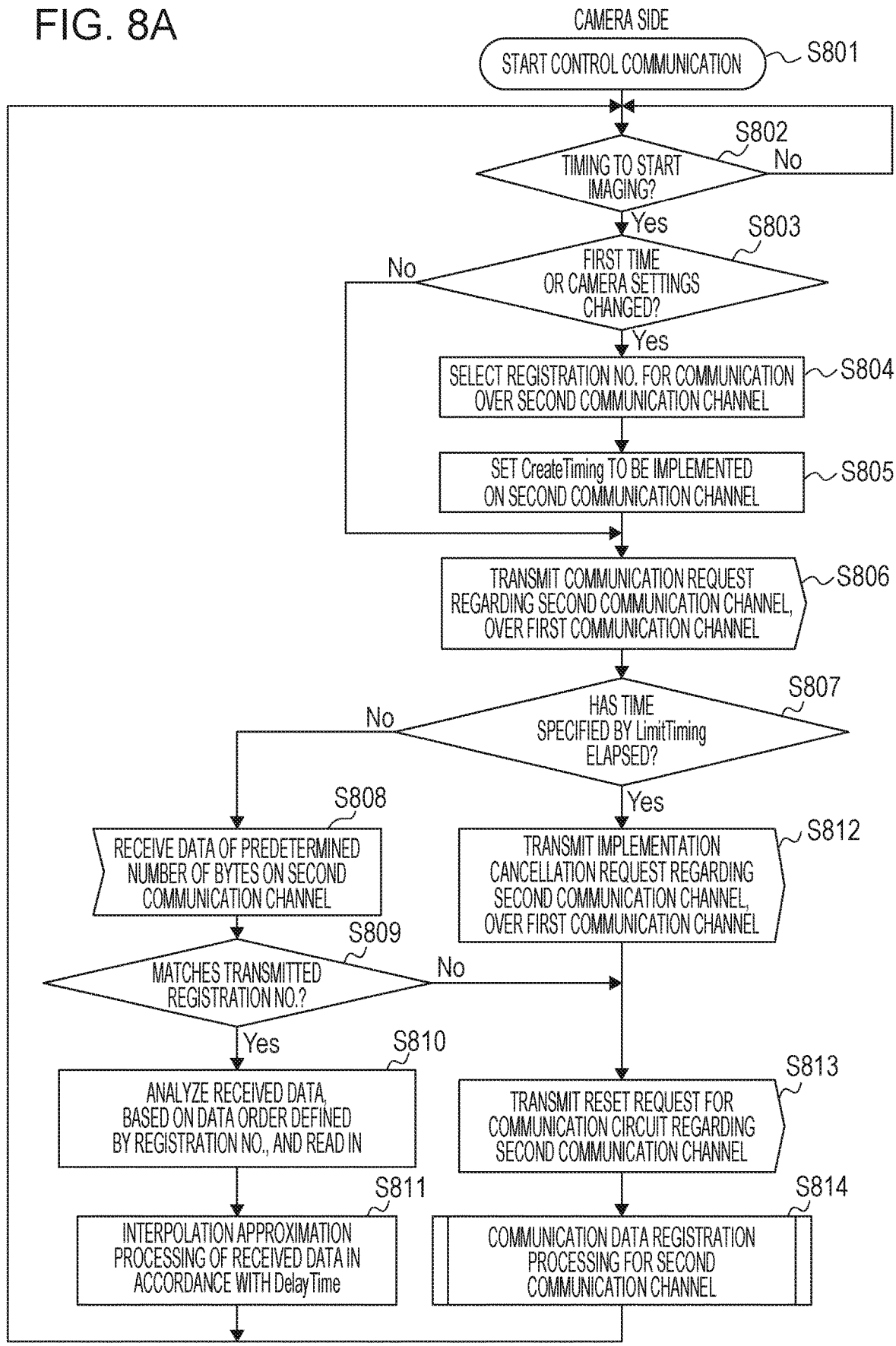
FIG. 8A is a flowchart illustrating communication processing that the camera microprocessor performs over the second communication channel in the first embodiment.

Next, communication processing performed by each of the camera microprocessor 205 and lens microprocessor 111 in the communication shown in FIG. 7 will be described with reference to the flowcharts in FIGS. 8A and 8B.

9-1. Communication Processing on Second Communication Channel by Camera Microprocessor 205 (FIG. 8A)

First, the communication processing that the camera microprocessor 205 performs will be described with reference to FIG. 8A. The camera microprocessor 205 starts communication processing for control (control communication) in S801. Next, in S802, the camera microprocessor 205 detects a start timing interruption of imaging control, that is an internal signal thereof. Note that a case is exemplified here where communication control is started with the start timing interruption for imaging control as a trigger, but a start timing interruption of other control may be used as a trigger.

Next, in S803, the camera microprocessor 205 determines whether or not this is the first time to perform communication using the second communication channel, and whether or not settings of the camera body 200 (camera settings) have been changed. In a case of performing communication using the second communication channel for the first time, in S804 the camera microprocessor 205 selects an optical data definition (i.e., registration No.) corresponding to the optical data regarding which the lens microprocessor 111 is to be requested to transmit, out of the multiple registered optical data definitions shown in FIG. 14.

Also, in a case where the camera settings have been changed, the registration No. corresponding to the optical data regarding which the lens microprocessor 111 is to be requested to transmit, is re-selected. For example, in a case where the imaging cycle (framerate) of the camera body 200 has been changed, there will be an increase or decrease in the time over which communication processing can be performed over the second communication channel depending on this framerate, so there are cases where it is better to change the optical data to be communicated over the second communication channel. Another reason is that, in a case where AF processing, automatic exposure (AE) processing, and image stabilization processing settings have been changed, as camera settings, there is a possibility that the content of the optical data that should be obtained over the second communication channel will change.

In S805, the camera microprocessor 205 sets parameters for the CreateTiming command 709 specifying the timing of the lens microprocessor 111 to obtain optical data. This is because when the framerate is changed, for example, accumulation center-of-gravity time and the like also change. In the present embodiment, the CreateTiming command 709 is set to obtain the optical data at the accumulation center-of-gravity time, as described above. The planned time from the communication time to be executed in the next step S806 to the accumulation center-of-gravity time is set in the CreateTiming command 709.

In S806, the camera microprocessor 205 transmits a second communication channel implementation request to the lens microprocessor 111 using the first communication channel. This request includes the second channel communication request command 706, registration No. command 707, LimitTiming command 708, and CreateTiming command 709.

Next, in S807, the camera microprocessor 205 determines whether or not the limit time specified to the lens microprocessor 111 in the LimitTiming command 708 has elapsed on not. In a case where the limit time has elapsed, the camera microprocessor 205 advances to S812. In a case where reception of the optical data from the lens microprocessor 111 via the second communication channel has been confirmed in S808 before the limit time elapses, the flow advances to S809. Judgement of reception of the optical data is performed by having detected the start bit serving as reception data in the communication waveforms illustrated in FIG. 4B2, for example. That is to say, if determination is made that transmission of optical data has started, the flow advances to S809, as one example in the present embodiment.

In S809, the camera microprocessor 205 confirms whether or not the registration No. 714 included in the optical data of the second channel transmission processing 713 illustrated in FIG. 7, which has been received in S808, matches the registration No. 707 that the registration No. command transmitted to the lens microprocessor 111 in S806. If the camera microprocessor 205 determines that the registration Nos. match, the flow advances to S810, and if determination is made that these do not match, the flow advances to S813.

In S810, the camera microprocessor 205 analyzes and holds the optical data transmitted from the lens microprocessor 111 via the second communication channel in the transmission order in optical data definitions shown in FIG. 14 for each registration No. That is to say, in a case where the registration No. is 1, two bytes of data, which are Data[0] and Data[1] are saved as focal length information, and the following three bytes of Data[2], Data[3], and Data[4] are saved as aperture diameter information. Subsequently, data analysis and holding is performed in the same way to off-focus correction information. Thereafter, the same processing is continued until focus correction information is saved.

In S811, the camera microprocessor 205 performs interpolation approximation processing of optical data, received in accordance with the value of DelayTime (715 in FIG. 7), in the data items communicated from the lens microprocessor 111 using the communication path of the second communication channel. For example, if the DelayTime is zero or a value near to zero, no interpolation approximation processing is performed. In a case where the DelayTime is greater than a predetermined value, interpolation approximation processing is performed using the optical data and time obtained from the communication path of the second communication channel the previous time, and the optical data and time obtained this time.

S812 is performed in a case where the optical data was not communicated before elapsing of the limit time that the camera microprocessor 205 specified in the LimitTiming command 708, with regard to the request for communication of optical data using the second communication channel. In the present embodiment, the camera microprocessor 205 transmits a communication cancellation request command (0xE1) for the second communication channel in FIG. 12, over the first communication channel.

In S813, the camera microprocessor 205 transmits a communication reset request command requesting resetting of the second communication channel, to the lens microprocessor 111 via the first communication channel. This is because there is a possibility that there has been a problem in data registration processing as to the second communication channel at the lens microprocessor 111, in a case where the camera microprocessor 205 has transmitted an implementation cancellation request for the second communication channel or there has been a mismatch in registration Nos. in S809. The reason that the camera microprocessor 205 requests the lens microprocessor 111 to reset the second communication channel is as follows. That is to say, the second communication channel is a channel that only transmits data from the lens microprocessor 111 to the camera microprocessor 205, so the lens microprocessor 111 has no way to confirm communication abnormalities due to noise and the like.

Next, in S814, there is a possibility that there has been a problem in data registration processing requested to the lens microprocessor 111, so the camera microprocessor 205 requests the lens microprocessor 111 to perform data registration processing at the second communication channel again. The data registration processing on the second communication channel is the same processing as that described in FIG. 5C. Upon the processing in S814 being completed, the flow returns to S802.

9-2. Communication Processing on Second Communication Channel by Lens Microprocessor 111 (FIG. 8B)

Next, the communication processing that the lens microprocessor 111 performs will be described with reference to FIG. 8B. In S821, the lens microprocessor 111 starts control communication.

Then in S822, the lens microprocessor 111 receives the second channel communication request command 706, registration No. command 707, LimitTiming command 708, and CreateTiming command 709, transmitted by the camera microprocessor 205 in S805, via the first communication channel. In a case where the registration No. command 707 received at this time indicates a registration No. that is unregistered at the lens microprocessor 111, the probability that the registration No. command 707 is not being exchanged correctly, due to communication disturbance such as noise or the like, is high. Accordingly, in a case of the lens microprocessor 111 receiving a registration No. command 707 indicating an unregistered No., the lens microprocessor 111 responds with a communication abnormality to the camera microprocessor 205. Upon confirming the response of a communication abnormality state from the lens microprocessor 111, the camera microprocessor 205 communicates a communication logic reset request command for the second communication channel (0x99 in hexadecimal) shown in FIG. 12. Upon receiving the communication logic reset request command, the lens microprocessor 111 initializes the communication logic circuit of the second communication channel.

In S823, the lens microprocessor 111 generates CreateTiming from the CreateTiming command 709 received from the camera microprocessor 205 along with the second communication channel communication implementation request command (0xE0) in S806, and the reception start time of this communication implementation request command. The lens microprocessor 111 further determines whether or not the time to obtain this optical data has already passed as of now, in S823. If the time has not elapsed yet, the flow transitions to S824, and if already elapsed, the flow transitions to S825.

In S824, the lens microprocessor 111 sets the parameter of the DelayTime command 715 to zero, and stands by until the time at which the optical data should be obtained. The DelayTime command 715 is a command included in data transmitted from the lens microprocessor 111 to the camera microprocessor 205 in later-described S830.

On the other hand, in S825, the lens microprocessor 111 sets information of the amount of time by which the time information at which the optical data should be obtained has elapsed to the current time, to the DelayTime command 715.

In S826, the lens microprocessor 111 obtains data in the order of registration of data items, stored associated with the registration No. specified in S822. In the present embodiment, optical data is obtained after standing by to the CreateTiming specified by the CreateTiming command 709, as described in S824. In a case where the optical data at this time can be predicted beforehand, the lens microprocessor 111 may obtain the optical data that is a predicted value, without standing by till this time.

In S827, the lens microprocessor 111 determines whether or not the reset request for the communication circuit regarding the second communication channel that the camera microprocessor 205 has transmitted in S813 was received using the first communication channel. In a case where the reset request has been received, the lens microprocessor 111 resets the communication circuit of the second communication channel within the lens microprocessor 111 in S828.

In S829, the lens microprocessor 111 determines whether or not the cancellation request for the second communication channel that the camera microprocessor 205 has transmitted in S812 has been received. In a case where this cancellation request has been received, the flow returns to S822. In a case where this cancellation request has not been received, the flow transitions to S830.

In S830, the lens microprocessor 111 transmits the data obtained in S826 to the camera microprocessor 205 using the second communication channel. Thus, the above flow control realizes the communication control illustrated in FIG. 7.

10. Advantages of First Embodiment

As described above, in a case of the camera microprocessor 205 obtaining optical data of the lens in the present embodiment, the camera microprocessor 205 transmits information relating to time to the lens microprocessor 111, as information relating to a timing for obtaining optical data of the lens. Accordingly, the camera microprocessor 205 can obtain optical data from the lens microprocessor 111 at the timing instructed by itself, so precision of control and responsivity of the camera microprocessor 205 can be improved.

Second Embodiment

A method of communicating optical data from the lens microprocessor 111 to the camera microprocessor 205 via the second communication channel was described in the first embodiment. In the example in the first embodiment, the camera microprocessor 205 transmits information relating to time to the lens microprocessor 111, as information instructing the timing to obtain optical data.

On the other hand, the camera microprocessor 205 cannot detect the timing of change in driving states of the actuators in the interchangeable lens 100 due to driving of the focus lens or the like, for example, in the first embodiment. Accordingly, communication cannot be performed that takes into consideration state changes of actuators at the interchangeable lens 100 side.

Accordingly, in the second embodiment, the lens microprocessor 111 communicates optical data and lens driving state using the second communication channel, at a timing according to the driving state of optical members, such as the focus lens or the like. Communication processing for realizing multiple communication requests over the second communication channel will be described below. Description of FIGS. 1 through 6 will be omitted, since the configuration is the same as in the first embodiment.

Figure 9:
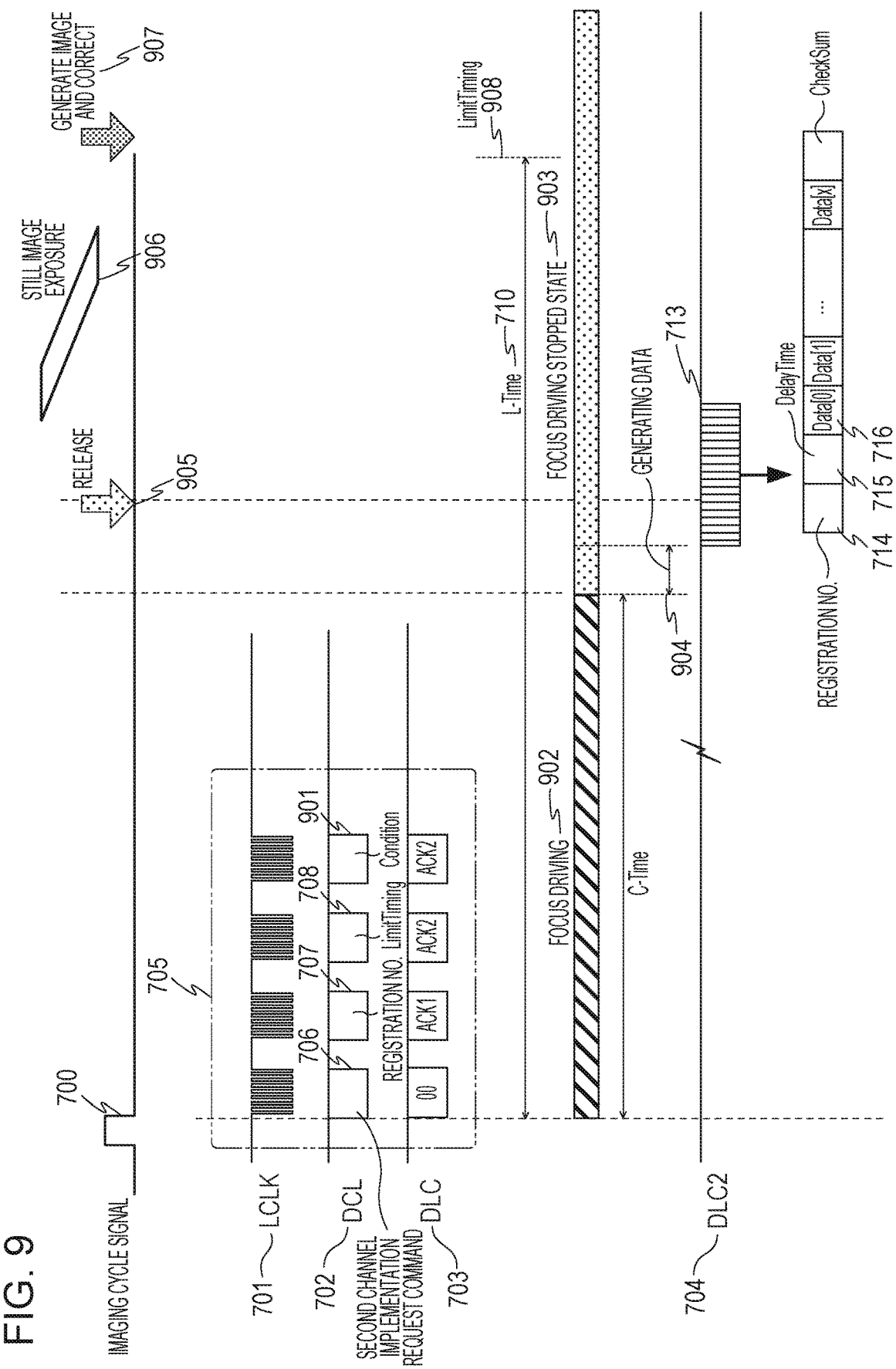
FIG. 9 is a diagram illustrating communication processing over a second communication channel according to a second embodiment of the present invention.

11. Timing Chart of Communication Processing on Second Communication Channel (FIG. 9)

First, the contents of processing will be described with reference to FIG. 9, which is a timing chart of communication processing. The imaging start timing 700 through second channel request processing 705 are the same as in the description in FIG. 7 according to the first embodiment, so description will be omitted.

As described earlier, the second channel communication request processing 705 is processing where communication over the second communication channel is requested from the camera microprocessor 205 to the lens microprocessor 111 over the first communication channel, having been triggered by the imaging start timing 700.

The commands transmitted from the camera microprocessor 205 to the lens microprocessor 111 in the second channel communication request processing 705 include the second channel communication request command 706, registration No. command 707, LimitTiming command 708, and Condition command 901. Description will be made below in detail with reference to FIGS. 15 and 16.

The second channel communication request command 706 is a command indicating information requesting execution of communication on the second communication channel (0xE0 in FIG. 12).

The registration No. command 707 is the registration No. (FIG. 14) corresponding to the data that the camera microprocessor 205 requests of the lens microprocessor 111. This is the first communication data definition in the second channel communication request processing 705. This is configured of focus position information, focus correction information, and so forth, that is necessary for AF control, for example.

The LimitTiming command 708 is time that the camera microprocessor 205 specifies, indicating the time limit for the lens microprocessor 111 to perform transmission of data (information that the registration No. command 707 specifies) over the second communication channel. The lens microprocessor 111 must start transmission of the optical data to the camera microprocessor 205 within limit time L-Time specified in the LimitTiming command 708, starting from the time of having received the second channel communication request 706.

The Condition command 901 is a command specifying a communication condition "Condition" that serves as a trigger to transmit to the camera microprocessor 205 optical data that the camera microprocessor 205 specifies in the registration No. command 707, over the second communication channel. By including the Condition command 901 transmitted from the camera microprocessor 205 to the lens microprocessor 111, a timing for transmitting the optical data to the camera microprocessor 205 can be specified, with a state change inside the lens microprocessor 111 as a condition.

As an example of state change serving as a condition in the present embodiment, change in the driving state of optical members such as the image stabilizing lens 103, focus lens 104, aperture unit 114, and so forth, can be specified, as illustrated in FIG. 16. For example, in a case of setting the timing at which the driven state of the focus lens 104 stops as the condition for implementing communication over the second communication channel, the camera microprocessor 205 sets 0x01 to the Condition command 901. In a case of setting the timing at which the driving of the aperture stops as the condition for implementing communication over the second communication channel, the camera microprocessor 205 sets 0x02 to the Condition command 901.

Multiple conditions may be specified in the present embodiment. For example, the "OR condition specification" indicated by Bit 7 in FIG. 16, which is the most significant bit in the Condition parameters is used in combination. In a case where the "OR condition specification" is "1", communication over the second communication channel is implemented at a timing that any one of multiple specified conditions exhibits a state change, and if the "OR condition specification" is "0", communication over the second communication channel is implemented at a timing that all of the multiple specified conditions are satisfied. More specifically, in a case where one or the other of stopping of focus driving (Bit 0) and stopping of aperture driving (Bit 1) being satisfied is to be the condition for implementing communication over the second communication channel, the camera microprocessor 205 uses the most significant bit 7 in combination, and sets 0x83 to the parameter in the Condition command 901. On the other hand, in a case where the timing of both stopping of focus driving and stopping of aperture driving being satisfied is to be the condition for implementing communication over the second communication channel, the camera microprocessor 205 sets the most significant bit 7 to 0, and sets 0x03 to the parameter in the Condition command 901.

A case where confirmation is made at the time of release that the focus drive state has stopped, and then transitions to the release processing, is illustrated as an example in the present embodiment. That is to say, description is made regarding a case where the camera microprocessor 205 has set 0x01 to the Condition command 901 parameter and the timing of the focus drive stopping has been specified as a condition to implement the second communication channel.

Focus driving 902 indicates that the focus drive circuit 120 that the interchangeable lens 100 has is in a state of driving the focus lens 104. When the focus lens 104 reaches a target position, transition is made to a focus driving stopped state. The lens microprocessor 111 obtains the optical data (data specified in FIG. 14) specified by the registration No. command 707 (registration No.) at time 904 (data obtaining), to implement communication over the second communication channel at the focus drive stopping timing specified in the Condition command 901. Data transmitted in the second channel transmission processing 713 includes the data items of registration No. command 714, DelayTime command 715, and optical data 716. The configuration is the same as in the first embodiment, so description will be omitted here.

Upon obtaining optical data at time 904, the lens microprocessor 111 starts the second channel transmission processing 713 at the second lens communication unit 112b. The camera microprocessor 205 transitions to release processing 905 under the condition that data transmitted in the second channel transmission processing 713 from the lens microprocessor 111 has been received. At this time, transition to the release processing 905 may be made after obtaining all data of the second channel transmission processing 713, or transitioning may be made to the release processing 905 at the stage of having obtained only data necessary for the release processing 905. In the case of the latter, settings need to be made in order from data items necessary for release, as the registration data definition in FIG. 14.

Upon having transitioned to the release processing 905, the camera microprocessor 205 implements still image exposure processing 906, and performs image generation/correction processing 907. Optical data necessary for image correction processing here is realized by setting in optical data 716, i.e., in the registration data definition in FIG. 14.

In a case where communication of the second channel transmission processing 713 is not started even after the limit time L-Time specified by the LimitTiming command 710 has elapsed, the camera microprocessor 205 transmits an implementation cancellation request for the second communication channel to the lens microprocessor 111 over the first communication channel. In this case, the communication processing necessary for the release is transmitted from the lens microprocessor 111 to the camera microprocessor 205 over the first communication channel.

12. Release Preparation Processing (FIGS. 10A and 10B)

Flowcharts for the camera microprocessor 205 and lens microprocessor 111 to realize the communication processing illustrated in FIG. 9 will be described with reference to FIGS. 10A and 10B. The flowcharts in FIGS. 10A and 10B illustrate an example of processing before implementing the release processing.
Release Preparation Processing by Camera Microprocessor 205 (FIG. 10A).

First, processing for release preparation at the camera body 200 side that the camera microprocessor 205 controls will be described. In the communication processing after the initial communication processing described in the first embodiment (second and subsequent communication processing), the camera microprocessor 205 starts the processing of this flowchart in S1001.

In S1002, the camera microprocessor 205 performs FA processing for release, and determines whether or not a focus drive request has been transmitted to the lens microprocessor 111 based on the results of this processing.

In S1003, the camera microprocessor 205 selects a registration No. (FIG. 14) corresponding to the optical data from registration Nos. registered beforehand, to obtain optical data necessary for release, over the second communication channel, and sets as parameters in the registration No. command 707.

In S1004, the camera microprocessor 205 sets the parameters of the Condition command 901, as the communication starting condition for communication by the second communication channel. In the present embodiment, 0x01 indicating "focus driving stopped" is set. The communication request for the second communication channel is communicated to the lens microprocessor 111 via the first communication channel. More specifically, the communication request for the second communication channel includes the second channel communication request command 706, registration No. command 707, LimitTiming command 708, and Condition command 901, as described with reference to FIG. 9.

In S1005, the camera microprocessor 205 determines whether or not the limit time L-Time specified in the LimitTiming command 708 transmitted to the lens microprocessor 111 has elapsed. In a case where the limit time L-Time has elapsed, the flow transitions to S1011. In a case where the desired data has been received in S1006 from the lens microprocessor 111 over the second communication channel before the limit time L-Time elapses, the flow advances to S1007.

In S1006, the camera microprocessor 205 receives optical data transmitted from the lens microprocessor 111 in S1027, in a flowchart at the interchangeable lens 100 side executed by the lens microprocessor 111, which will be described later with reference to FIG. 10B.

In S1007, the camera microprocessor 205 determines whether or not the registration No. 714 included in the data received in S1006, matches the registration No. 707 that the camera microprocessor 205 transmitted to the lens microprocessor 111. If matching, the flow transitions to S1008, and if not matching, the flow transitions to S1012.

In S1008, the camera microprocessor 205 analyzes and holds the optical data transmitted from the lens microprocessor 111 via the second communication channel in the transmission order in optical data definitions shown in FIG. 14 for each registration No. That is to say, in a case where the registration No. is 1, two bytes of data, which are Data[0] and Data[1] are saved as focal length information, and the following three bytes of Data[2], Data[3], and Data[4] are saved as aperture diameter information. Subsequently, data analysis and holding is performed in the same way to off-focus correction information. Thereafter, the same processing is continued up to saving of focus correction information.

In S1009, the camera microprocessor 205 confirms that driving of the focus lens 104 has stopped upon having received the communication by the second channel transmission processing 713, and release processing starts.

In S1010, the camera microprocessor 205 performs exposure processing, and performs image correction processing on the imaged image. Focal length information, image distortion correction information from lens aberration, and so forth, are obtained beforehand in the second channel transmission processing 713 as information necessary of image correction processing, and image correction processing is performed based on this optical data.
Release Preparation Processing by Lens Microprocessor 111 (FIG. 10B)

Next, processing at the interchangeable lens 100 side that is controlled by the lens microprocessor 111 will be described. The lens microprocessor 111 starts the processing of this flowchart from a communication standby state in S1021.

In S1022, the lens microprocessor 111 receives an implementation request for the second communication channel, which the camera microprocessor 205 transmits in S1004.

In S1023, the lens microprocessor 111 determines whether or not the reset request for the communication circuit regarding the second communication channel, which the camera microprocessor 205 has transmitted in S1012 using the first communication channel, has been received. If not received, the flow transitions to S1025. If received, the flow transitions to S1024, and the communication circuit of the second communication channel within the lens microprocessor 111 is reset.

In S1025, the lens microprocessor 111 determines whether or not the communication cancellation request for the second communication channel, which the camera microprocessor 205 has transmitted in S1011, has been received. If the communication cancellation request has been received, the flow returns to S1022. If the communication cancellation request has not been received, the flow transitions to S1026.

In S1026, the lens microprocessor 111 references the communication condition "Condition" parameter specified by the Condition command 901 included in the implementation request for the second communication channel received from the camera microprocessor 205 in S1022. Whether the specified condition is satisfied or not is determined. In the present embodiment, whether driving of the focus lens 104 is stopped is determined. In a case where the condition is not satisfied, i.e., driving of the focus lens 104 is not stopped, the flow returns to S1023. In a case where the condition is satisfied, i.e., driving of the focus lens 104 is stopped, the flow transitions to S1027.

In S1027, the lens microprocessor 111 obtains optical data requested by the camera microprocessor 205 in S1022. The optical data is then transmitted to the camera microprocessor 205 using the second communication channel.

The communication control illustrated in FIG. 10 is realized by the above flow control. Performing communication using the communication path of the second communication channel regarding optical data and the driving state of the lens, at the timing where the focus actuator of the lens being stopped in response to a focus drive request, enables responsivity of AF control to be improved.

13. Advantages of Second Embodiment

As described above, information relating to a driving state of an optical member is transmitted from the camera microprocessor 205 to the lens microprocessor 111 that obtains optical data, as information relating to the timing for obtaining optical data of the lens. Accordingly, precision and responsivity of various types of functions making up the imaging apparatus, and particularly processing involving driving of optical members, can be improved.

14. Other Embodiments

The present invention can be realized by supplying a program realizing one or more functions of the above-described embodiments to a system or device, via a network or storage medium, and one or more processors in a computer of the system or device reading out and executing the program. The present invention can also be realized by a circuit that realizes one or more functions (e.g., an application-specific integrated circuit (ASIC)).

It should be noted that the above-described embodiments are only representative examples, and that various modifications and alterations may be made to the embodiments when carrying out the present invention.

Figure 17:
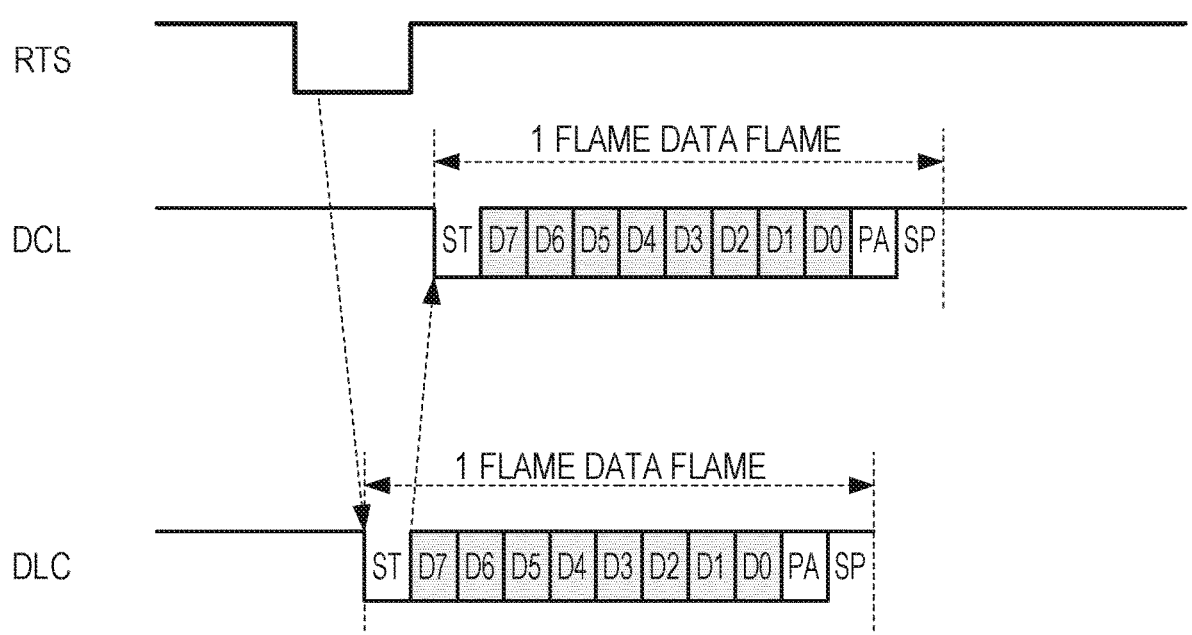
FIG. 17 is a diagram illustrating waveforms of signals transmitted and received between the camera microprocessor and lens microprocessor by the three-line asynchronous communication.

Regarding the first communication channel, communication by the three-line clock synchronous communication is shown in the first embodiment and the second embodiment. As explained earlier, three-line asynchronous communication can be applied to the first embodiment and the second embodiment instead of the three-line clock synchronous communication. Shown in FIG. 17 is waveforms of signals transmitted and received between the camera microprocessor 205 and lens microprocessor 111 by three-line asynchronous communication. RTS communication line (RTS) serves as a first communication line, when three-line asynchronous communication is performed. The RTS communication line is a communication line that supplies transmission request signals serving as timing signals for obtaining data from the camera microprocessor 205 that is the communication master for the lens microprocessor 111 (and may be called a "transmission request channel").

The transmission request channel, for example, is used for providing the notices such as the transmission requests (transmission instructions) for the lens data and switch requests (switch instructions) for communication processes described later, from the camera microcomputer 205 to the lens microcomputer 111. The provision of the transmission request is performed by switching a signal level (voltage level) on the transmission request channel between High as a first level and Low as a second level. A transmission request signal provided to the transmission request channel is hereinafter referred to as "a request-to-send signal RTS". The request-to-send signal RTS is provided from the camera microcomputer 205 as a communication master to the lens microcomputer 111 as a communication slave.

When the request-to-send signal RTS is received, the lens microcomputer 111 sets the signal level to Low in one bit time period in order to provide a notice of a start of one frame transmission of the lens data signal DLC to the camera microcomputer 205. The one bit time period indicating a start of one frame is called "a start bit ST". That is, one data frame is started from this start bit ST. The start bit ST is provided as a head bit of each one frame of the lens data signal DLC. Next, the lens microcomputer 111 transmits one-byte lens data in an 8-bit time period from a subsequent second bit to a ninth bit. The data bits are arranged in an MSB-first format starting from a highest-order data bit D7 and continuing to data bits D6, D5, D4, D3, D2 and D1 in this order and ending with a lowest-order data bit D0. The lens microcomputer 111 then adds one bit parity information (parity bit) PA at a tenth bit and sets the signal level of the lens data signal DLC to High in a time period of a stop bit SP indicating an end of the one frame. Thus, the data frame starting from the start bit SP ends.

As explained above, when the three-line asynchronous communication is performed at the first communication channel, the communication via the second communication line and the third communication line is performed at corresponding timing with the request-to-send signal RTS transmitted via the RTS communication line. In other word, the camera microprocessor 205 serves as a communication master to control timing of the communication performed at the first communication channel.

On the other hand, the lens microprocessor 111 serves as a communication master to control timing of the communication performed at the second communication channel, and communication can be performed at a timing not dependent on the timing of communication by the first communication channel. More specifically, communication by the second lens-camera communication line can be performed at the timing regardless of timings corresponding to clock signals transmitted from the camera microprocessor 205 to the lens microprocessor 111 via the clock communication line.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-108270 filed May 31, 2017, and Japanese Patent Application No. 2018-089460 filed May 7, 2018, which are hereby incorporated by reference herein in their entirety.

What is claimed is:

1. An imaging apparatus capable of being mounted with an accessory, the imaging apparatus comprising:
a controller including a processor and a memory, wherein the controller is configured to perform operations including:
controlling a first communication via a first communication line, a second communication line, a third communication line, and a fourth communication line,
transmitting, via the fourth communication line, a control signal to control transmission of information via the first communication line and to control reception of information via the third communication line,
transmitting, along with first instruction information requesting for optical data of the accessory, first information, and
receiving, in response to transmission of the first instruction information, the optical data via the second communication line regardless of the control signal of the fourth communication line,
wherein, in a case where the optical data is continuously changing, the optical data received via the second communication line differs according to the first information.

2. The imaging apparatus according to claim 1, wherein the first information is information indicating a first predetermined time, and receiving includes receiving, via the second communication line, the optical data which the accessory starts to receive at a timing based on the first predetermined time.

3. The imaging apparatus according to claim 2, wherein receiving includes receiving, via the second communication line, the optical data at a time when the first predetermined time indicated in the first information has elapsed from a timing at which the accessory received the first instruction information.

4. The imaging apparatus according to claim 1, wherein the first information is information relating to a condition for the accessory to start receiving the optical data, and controlling includes receiving, via the second communication line, the optical data at a timing satisfying this condition.

5. The imaging apparatus according to claim 4, wherein the first information is information specifying a driving state of an optical member included in the accessory as a condition for the accessory to start receiving the optical data.

6. The imaging apparatus according to claim 1, wherein transmitting includes transmitting, via the first communication line, second information relating to a timing for the accessory to transmit the optical data, along with the first instruction information.

7. The imaging apparatus according to claim 6,
wherein the second information is information indicating a second predetermined time, and
wherein, in a case where receiving includes not receiving the optical data via the second communication channel at a time based on the second information, transmitting includes transmitting, via the first communication channel, second instruction information requesting resetting of a communication that the accessory performs.

8. The imaging apparatus according to claim 6, wherein the second predetermined time indicated by the second information is shorter than the first predetermined time corresponding to the first information.

9. The imaging apparatus according to claim 1,
wherein transmitting includes transmitting third instruction information relating to control of operations of the accessory via the first communication line, and receiving includes receiving accessory data from the accessory as a response to the third instruction information via the third communication line, and
wherein the optical data received via the second communication channel is data other than the accessory data received from the accessory device via the third communication line.

10. The imaging apparatus according to claim 9, wherein, in a case of not performing communication via the second communication channel, the optical data is received via the third communication line.

11. The imaging apparatus according to claim 1, wherein transmitting includes transmitting, along with the first instruction information and the first information, second instruction information requesting the accessory to transmit the optical data via the second communication line.

12. The imaging apparatus according to claim 1, wherein, in a case where the optical data is continuously changing, the optical data received via the second communication line differs according to the first information.

13. The imaging apparatus according to claim 12, wherein the optical data is received via the second communication line regardless of whether the optical data is changed or not.

14. The imaging apparatus according to claim 1, wherein communication via the second communication line is performed by asynchronous communication method.

15. An accessory that can be mounted to the imaging apparatus according to claim 1, wherein the optical data is transmitted to the imaging apparatus as a response to the first control information via the second communication line.

16. An accessory capable of being mounted to an imaging apparatus, the accessory comprising:
a controller including a processor and a memory, wherein the controller is configured to perform operations including:
controlling a first communication via a first communication line, a second communication line, a third communication line, and a fourth communication line,
receiving, via the fourth communication line, a control signal to control receiving of information via the first communication line and to control transmission of information via the third communication line,
receiving, along with first instruction information requesting for optical data of the accessory, first information, and transmitting, in response to receiving of the first instruction information, the optical data via the second communication line regardless of the control signal of the fourth communication line, wherein, in a case where the optical data is continuously changing, the optical data received via the second communication line differs according to the first information.

17. The accessory according to claim 16, wherein the first information is information indicating a first predetermined time, and receiving includes receiving the optical data at a timing based on the first predetermined time.

18. The accessory according to claim 17, wherein receiving includes starting to receive the optical data at a time when the first predetermined time indicated in the first information has elapsed from a timing at which the accessory has received the first instruction information.

19. The accessory according to claim 16, wherein the first information is information relating to a condition to start receiving the optical data, and receiving includes receiving the optical data at a timing satisfying this condition.

20. The accessory according to claim 19, wherein the first information is information specifying a driving state of an optical member included in the accessory as a condition to start receiving the optical data.

21. The accessory according to claim 16, wherein receiving includes receiving, via the first communication line, second information relating to a timing for the controller to transmit the optical data to the imaging apparatus, along with the first instruction information.

22. The accessory according to claim 21,
wherein the second information is information indicating a second predetermined time, and
wherein, in a case where transmitting includes not transmitting the optical data via the second communication line at a time based on the second information, the controller resets itself in response to receiving, via the first communication line, second instruction information requesting resetting of processing of the controller.

23. The accessory according to claim 16,
wherein receiving includes receiving third instruction information relating to control of operations of the accessory via the first communication line, and transmitting includes transmitting accessory data from the accessory as a response to the third instruction information via the third communication line, and
wherein the optical data transmitted via the second communication channel is data other than the accessory data transmitted to the accessory device via the third communication line.

24. The accessory according to claim 16, wherein, in a case of not performing communication via the second communication channel, the optical data is transmitted via the third communication line.

25. The accessory according to claim 16, wherein receiving includes receiving, along with the first instruction information and the first information, second instruction information requesting the accessory to transmit the optical data via the second communication line.

26. The imaging apparatus according to claim 16, wherein, in a case where the optical data is continuously changing, the optical data transmit via the second communication line differs according to the first information.

27. The imaging apparatus according to claim 26, wherein the optical data is transmitted via the second communication line regardless of whether the optical data is changed or not.

28. The imaging apparatus according to claim 16, wherein communication via the second communication line is performed by asynchronous communication method.

29. A control method for an imaging apparatus capable of being mounted with an accessory and having a controller including a processor and a memory, the control method comprising:
controlling a first communication via a first communication line, a second communication line, a third communication line, and a fourth communication line;
transmitting, via the fourth communication line, a control signal to control transmission of information via the first communication line and to control reception of information via the third communication line;
transmitting, along with first instruction information requesting for optical data of the accessory, first information; and
receiving, in response to transmission of the first instruction information, the optical data via the second communication line regardless of the control signal of the fourth communication line,
wherein, in a case where the optical data is continuously changing, the optical data received via the second communication line differs according to the first information.

30. A control method of an accessory capable of being mounted to an imaging apparatus and having a controller, the control method comprising:
controlling a first communication via a first communication line, a second communication line, a third communication line, and a fourth communication line;
receiving, via the fourth communication line, a control signal to control receiving of information via the first communication line and to control transmission of information via the third communication line;
receiving, along with first instruction information requesting for optical data of the accessory, first information; and
transmitting, in response to receiving of the first instruction information, the optical data via the second communication line regardless of the control signal of the fourth communication line,
wherein, in a case where the optical data is continuously changing, the optical data received via the second communication line differs according to the first information.

* * * * *